US012557279B2

(12) United States Patent
Gao et al.

(10) Patent No.: US 12,557,279 B2
(45) Date of Patent: Feb. 17, 2026

(54) THREE-DIMENSIONAL MEMORY AND FABRICATION METHOD FOR THE SAME

(71) Applicant: YANGTZE MEMORY TECHNOLOGIES CO., LTD., Hubei (CN)

(72) Inventors: Tingting Gao, Hubei (CN); Zhiliang Xia, Hubei (CN); Xiaoxin Liu, Hubei (CN); Changzhi Sun, Hubei (CN); Xiaolong Du, Hubei (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 709 days.

(21) Appl. No.: 17/845,308

(22) Filed: Jun. 21, 2022

(65) Prior Publication Data

US 2022/0406813 A1    Dec. 22, 2022

(30) Foreign Application Priority Data

Jun. 21, 2021 (CN) .......................... 202110687429.2

(51) Int. Cl.
*H10B 43/27* (2023.01)
*H10B 41/27* (2023.01)

(52) U.S. Cl.
CPC ............. *H10B 43/27* (2023.02); *H10B 41/27* (2023.02)

(58) Field of Classification Search
CPC ........ H10B 43/27; H10B 41/27; H10B 43/10; H10B 43/50; H10B 43/35; H10B 41/30; H10B 12/20; H10B 69/00; G11C 11/5671; G11C 16/0475; G11C 2216/02; G11C 11/5621; G11C 16/02
See application file for complete search history.

(56) References Cited

U.S. PATENT DOCUMENTS 9,922,987 B1   3/2018  Mizutani et al.
11,792,994 B2  10/2023 Kanamori et al.
(Continued)

FOREIGN PATENT DOCUMENTS

CN    107482013 A    12/2017
CN    108934183 A    12/2018
(Continued)

*Primary Examiner* — Ajay Ojha
*Assistant Examiner* — Sandra Milena Rodriguez Villanu
(74) *Attorney, Agent, or Firm* — HANLEY, FLIGHT & ZIMMERMAN, LLC

(57) ABSTRACT

The present application provides a three-dimensional memory and a fabrication method for the same. The method includes forming a storage stack structure on a substrate and forming a storage channel structure that penetrates the storage stack structure, forming a selection stack structure stacked on the storage stack structure and forming a selection channel structure that penetrates the selection stack structure and is connected to the storage channel structure. The width of the selection channel structure is smaller than the width of the storage channel structure on a plane parallel to the substrate and forming a TSG cut structure that penetrates the selection stack structure. The three-dimensional memory and the fabrication method for the same increases the process window for the TSG cut structure formed between the selection channel structures and improves the storage density.

11 Claims, 17 Drawing Sheets

(56) References Cited

U.S. PATENT DOCUMENTS

| | | | |
|---|---|---|---|
| 2018/0061851 A1 | 3/2018 | Ootsuka | |
| 2020/0243677 A1 | 7/2020 | Lu et al. | |
| 2020/0373355 A1 | 11/2020 | Lien et al. | |
| 2021/0143160 A1* | 5/2021 | Ryu | H10B 43/10 |
| 2021/0313427 A1* | 10/2021 | Kim | H01L 25/074 |
| 2021/0327805 A1* | 10/2021 | Lee | G11C 16/08 |

FOREIGN PATENT DOCUMENTS

| | | |
|---|---|---|
| CN | 109727908 A | 5/2019 |
| CN | 109817627 A | 5/2019 |
| CN | 112635483 A | 4/2021 |

* cited by examiner

THREE-DIMENSIONAL MEMORY AND FABRICATION METHOD FOR THE SAME

CROSS-REFERENCE TO RELATED APPLICATIONS AND INCORPORATED BY REFERENCE

This application claims priority to Chinese Patent Application No. 202110687429.2 filed on Jun. 21, 2021, which is incorporated herein by reference in its entirety.

TECHNICAL FIELD

The present disclosure generally relates to the field of semiconductor technology, and more particularly, to a three-dimensional memory device and a fabrication method for the same.

BACKGROUND

Three-dimensional memories (3D NAND) can increase their storage capacities by increasing the number of vertically stacked layers or the storage density of the channel structures. Specifically, the storage density of the three-dimensional memory can be increased by optimizing the arrangement of the channel structures.

In some arrangements of the channel structures, the channel structures are divided into multiple rows in a storage block in a mutually staggered arrangement. A top selection gate (TSG) cut structure is formed between the channel structure rows to divide the channel structure rows in a storage block into several parts, to more easily control the divided storage block to perform operations such as programming and erasing.

BRIEF SUMMARY

The present application provides a fabrication method for a three-dimensional memory. The fabrication method can include forming a storage stack structure on a substrate and forming a storage channel structure that penetrates the storage stack structure. A selection stack structure can be stacked on the storage stack structure and a selection channel structure, which penetrates the selection stack structure, can be connected to the storage channel structure. In some embodiments, a width of the selection channel structure in a first direction, can be smaller than a width of the storage channel structure in the first direction. A TSG cut structure can be formed to penetrate the selection stack structure. In order to avoid overlap between the TSG structure and the channel structure rows, the distance between the channel structure rows can be increased. Alternatively, the TSG cut structure can be formed to penetrate the channel structure row in a middle position, and use the channel structure row in the middle position as a dummy channel structure row. In this alternative arrangement, the channel structures in the channel structure row in the middle position do not have a storage function. Nonetheless, these arrangements limit the ability to increase storage density. Therefore, a need exists to increase storage density in a three-dimensional storage unit while avoiding the overlap between the channel structures and the top select gate structure.

In some embodiments, forming the storage stack and the selection channel stack can include alternately disposing dielectric layers and sacrificial layers to form a multi-layered stack.

In some embodiments, the method includes forming a selection channel hole that penetrates the selection stack structure and exposes the storage channel structure. The method further includes forming an insulating layer on an inner wall of the selection channel hole followed by removing a part of the insulating layer located at a bottom of the selection channel hole to expose the storage channel structure. Forming a conductive layer on a surface of the insulating layer and the bottom of the selection channel hole.

In some embodiments, forming the selection channel structure that penetrates the selection stack structure can further include filling in the selection channel hole where the insulating layer and the conductive layer are formed with a dielectric material.

In some embodiments, after filling in the selection channel hole where the insulating layer and the conductive layer are formed with the dielectric material, the method can further include forming a stop layer at an end part of the dielectric material away from the substrate.

In some embodiments, forming the stop layer can include removing a part of the dielectric material from the dielectric filled selection channel at an end away from the substrate. This forms a first opening that exposes the conductive layer. The stop layer can be formed in the first recessed hole. The material forming the stop layer can include silicon nitride, for example.

In some embodiments, before the step of forming the TSG cut structure that penetrates the selection stack structure, the method can further include forming a cap layer to cover the selection channel structure and a surface of the selection stack structure away from the substrate.

In some embodiments, the method can further include removing the sacrificial layers from the alternately stacked dielectric and sacrificial layers in the storage stack structure and the selection stack structure to form sacrificial gaps. The sacrificial gaps can be filled with a conductive material to form a gate layer.

In some embodiments, the step of forming the TSG cut structure that penetrates the selection stack structure can include forming a TSG cut that penetrates the selection stack structure. The method can further include filling in the TSG cut with a dielectric material to form the TSG cut structure.

In some embodiments, multiple selection channel structures are arranged in rows in a direction parallel to the substrate, and the TSG cut structure can extend between adjacent selection channel structure rows.

In some embodiments, a shape of the TSG cut structure along a third direction can include a wave shape.

In some embodiments, in a direction perpendicular to the substrate, a distance between an axis of the selection channel structure in at least one selection channel structure row located on two sides of the TSG cut structure and the TSG cut structure is greater than a distance between the storage channel structure connected to the selection channel structure and the TSG cut structure. The number of the at least one selection channel structure row is less than or equal to half of the number of selection channel structure rows between adjacent TSG cut structures.

In some embodiments, the method can further include forming a selection channel plug in contact with the conductive layer at an end part of the selection channel structure away from the substrate.

In some embodiments, the step of forming the selection channel plug can include removing the stop layer and parts of the conductive layer and the insulating layer corresponding to the stop layer to form a second recessed opening that exposes the conductive layer. The method further includes reaming the second recessed opening and filling in the second recessed opening with a conductive material to form the selection channel plug.

In some embodiments, the storage stack structure can include multiple sub-storage stack structures, and the storage channel structure can include multiple sub-storage channel structures.

Embodiments directed towards the structure of the three-dimensional memory have been included in methods for fabricating the three-dimensional memory disclosed above. In the three-dimensional memory and the fabrication method for the same provided in embodiments of the present application, the selection channel structure and the storage channel structure are prepared separately, and the width of the bottom of the selection channel structure is smaller than the width of the top of the storage channel structure, so that the process window of forming the TSG cut structure between the selection channel structures can be increased. In addition, the fabrication method is able to avoid increasing the distance between the storage channel structure rows or adding dummy storage channel structure rows, provides various benefits including but not limited to improving the storage density. Other benefits have not been included here for simplicity.

Other aspects of the present disclosure can be understood by those skilled in the art in light of the description, the claims, and the drawings of the present disclosure

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure FIG. 1A through 1K illustrate schematic cross-sectional views of an exemplary method for fabricating a three-dimensional memory, in accordance with some embodiments of the present disclosure.

DETAILED DESCRIPTION

Figure 1A:
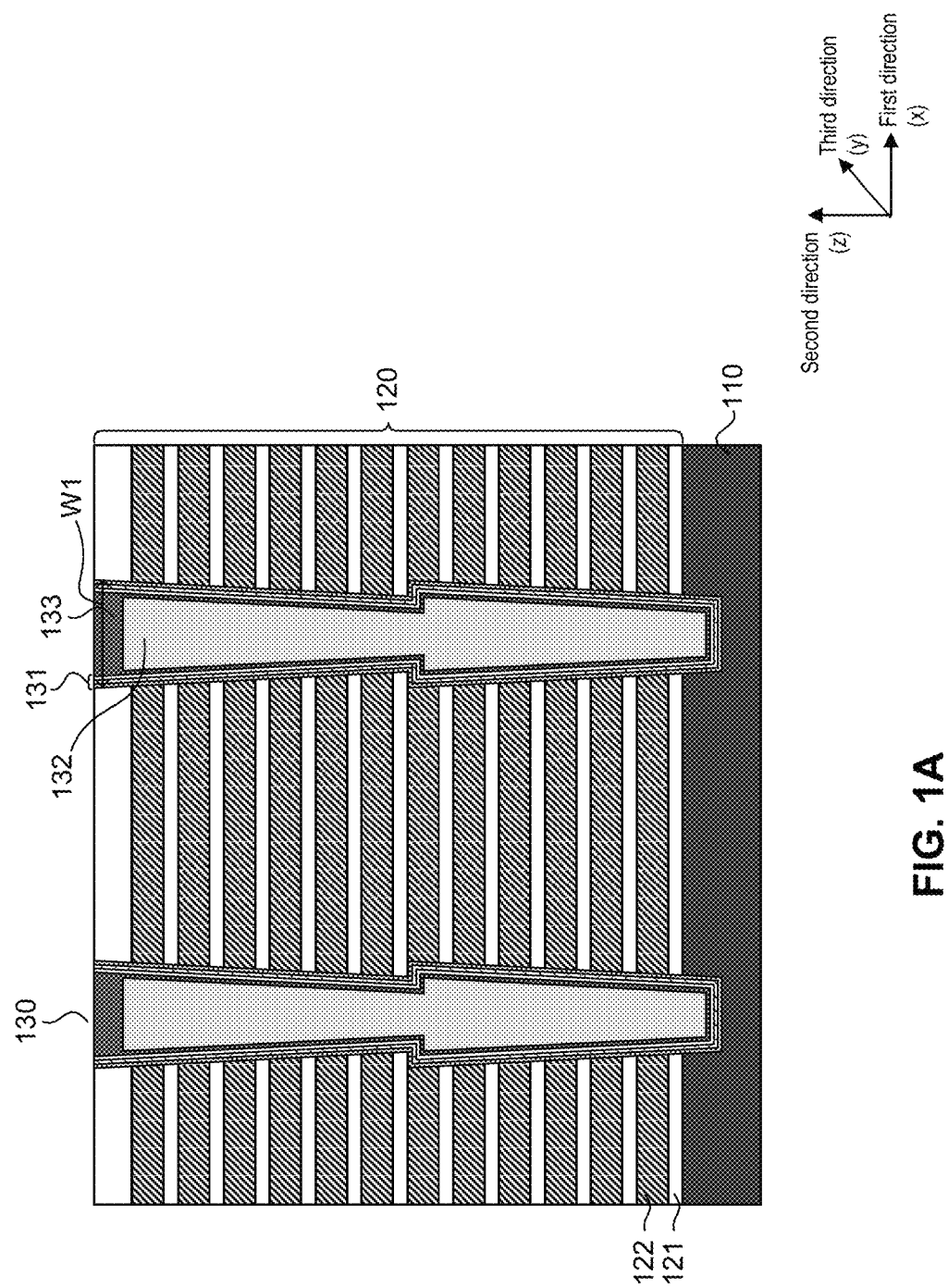

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described can include a particular feature, structure, or characteristic, but every embodiment can not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to affect such feature, structure or characteristic in connection with other embodiments whether or not explicitly described.

The terms used herein are for the purpose of describing specific exemplary embodiments and are not intended to be limiting. When used in the description, the terms "includes," "including," "includes" and/or "comprising" indicate the existence of stated features, integers, elements, components and/or combinations thereof, but do not exclude the existence of one or more other features, integers, elements, components and/or combinations thereof.

In general, terminology can be understood at least in part from usage in context. For example, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context It should be readily understood that the meaning of "on," "above," and "over" in the present disclosure should be interpreted in the broadest manner such that "on" not only means "directly on" something, but also includes the meaning of "on" something with an intermediate feature or a layer there between. Moreover, "above" or "over" not only means "above" or "over" something, but can also include the meaning it is "above" or "over" something with no intermediate feature or layer there between (i.e., directly on something).

Further, spatially relative terms, such as "beneath," "below," "lower," "above," "upper," and the like, can be used herein for ease of description to describe one element or feature's relationship to another element(s) or feature(s) as illustrated in the figures. The spatially relative terms are intended to encompass different orientations of the device in use or process step in addition to the orientation depicted in the figures. The apparatus can be otherwise oriented (rotated 90 degrees or at other orientations) and the spatially relative descriptors used herein can likewise be interpreted accordingly.

As used herein, the term "substrate" refers to a material onto which subsequent material layers are added. The substrate includes a "top" surface and a "bottom" surface. The top surface of the substrate is typically where a semiconductor device is formed, and therefore the semiconductor device is formed at a top side of the substrate unless stated otherwise. The bottom surface is opposite to the top surface and therefore a bottom side of the substrate is opposite to the top side of the substrate. The substrate itself can be patterned. Materials added on top of the substrate can be patterned or can remain unpatterned. Furthermore, the substrate can include a wide array of semiconductor materials, such as silicon, germanium, gallium arsenide, indium phosphide, for example. Alternatively, the substrate can be made from an electrically non-conductive material, such as a glass, a plastic, or a sapphire wafer.

As used herein, the term "layer" refers to a material portion including a region with a thickness. A layer has a top side and a bottom side where the bottom side of the layer is relatively close to the substrate and the top side is relatively away from the substrate. A layer can extend over the entirety of an underlying or overlying structure, or can have an extent less than the extent of an underlying or overlying structure. Further, a layer can be a region of a homogeneous or inhomogeneous continuous structure that has a thickness less than the thickness of the continuous structure. For example, a layer can be located between any set of horizontal planes between, or at, a top surface and a bottom surface of the continuous structure. A layer can extend horizontally, vertically, and/or along a tapered surface. A substrate can be a layer, can include one or more layers therein, and/or can have one or more layer thereupon, there above, and/or there below. A layer can include multiple layers. For example, an interconnect layer can include one or more conductive and contact layers (in which contacts, interconnect lines, and/or vertical interconnect accesses (VIAs) are formed) and one or more dielectric layers.

In the present disclosure, for ease of description, "tier" is used to refer to elements of substantially the same height along the vertical direction. For example, a word line and the underlying gate dielectric layer can be referred to as "a tier," a word line and the underlying insulating layer can together be referred to as "a tier," word lines of substantially the same height can be referred to as "a tier of word lines" or similar, and so on.

As used herein, the term "nominal/nominally" refers to a desired, or target, value of a characteristic or parameter for a component or a process step, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

In the present disclosure, the term "horizontal/horizontally/lateral/laterally" means nominally parallel to a lateral surface of a substrate, and the term "vertical" or "vertically" means nominally perpendicular to the lateral surface of a substrate.

As used herein, the term "3D memory" refers to a three-dimensional (3D) semiconductor device with vertically oriented strings of memory cell transistors (referred to herein as "memory strings," such as NAND strings) on a laterally-oriented substrate so that the memory strings extend in the vertical direction with respect to the substrate.

The description is made herein with reference to schematic views of exemplary embodiments. The exemplary embodiments disclosed herein should not be construed as being limited to the specific shapes and sizes shown, but include various equivalent structures capable of realizing the same functions and deviations in shapes and sizes caused by, for example, manufacturing. The positions shown in the drawings are schematic in nature, and are not intended to limit the positions of the components.

Unless otherwise defined, all terms (including technical and scientific terms) used herein have the same meanings as commonly understood by an ordinary person skilled in the art to which the present disclosure belongs. The terms such as those defined in commonly used dictionaries should be interpreted as having meanings consistent with their meanings in the context of the relevant fields, and will not be interpreted in an idealized or excessively formal sense unless they are clearly defined herein as such.

The present disclosure provides a fabrication method 200 for a three-dimensional memory and the three-dimensional memory fabricated from the method 200. An example of the fabrication method is outlined in the flow diagram on FIG. 2. FIGS. 1A through 1K illustrate schematic cross-sectional views of stages of fabrication of the three dimensional memory. The steps shown in the method 200 are not exclusive, and other steps can be further performed before, after, or between any of the steps shown. Additionally, some of the steps can be executed simultaneously or can be executed in a sequence different from that shown in FIGS. 1A-1K.

Figure 2:
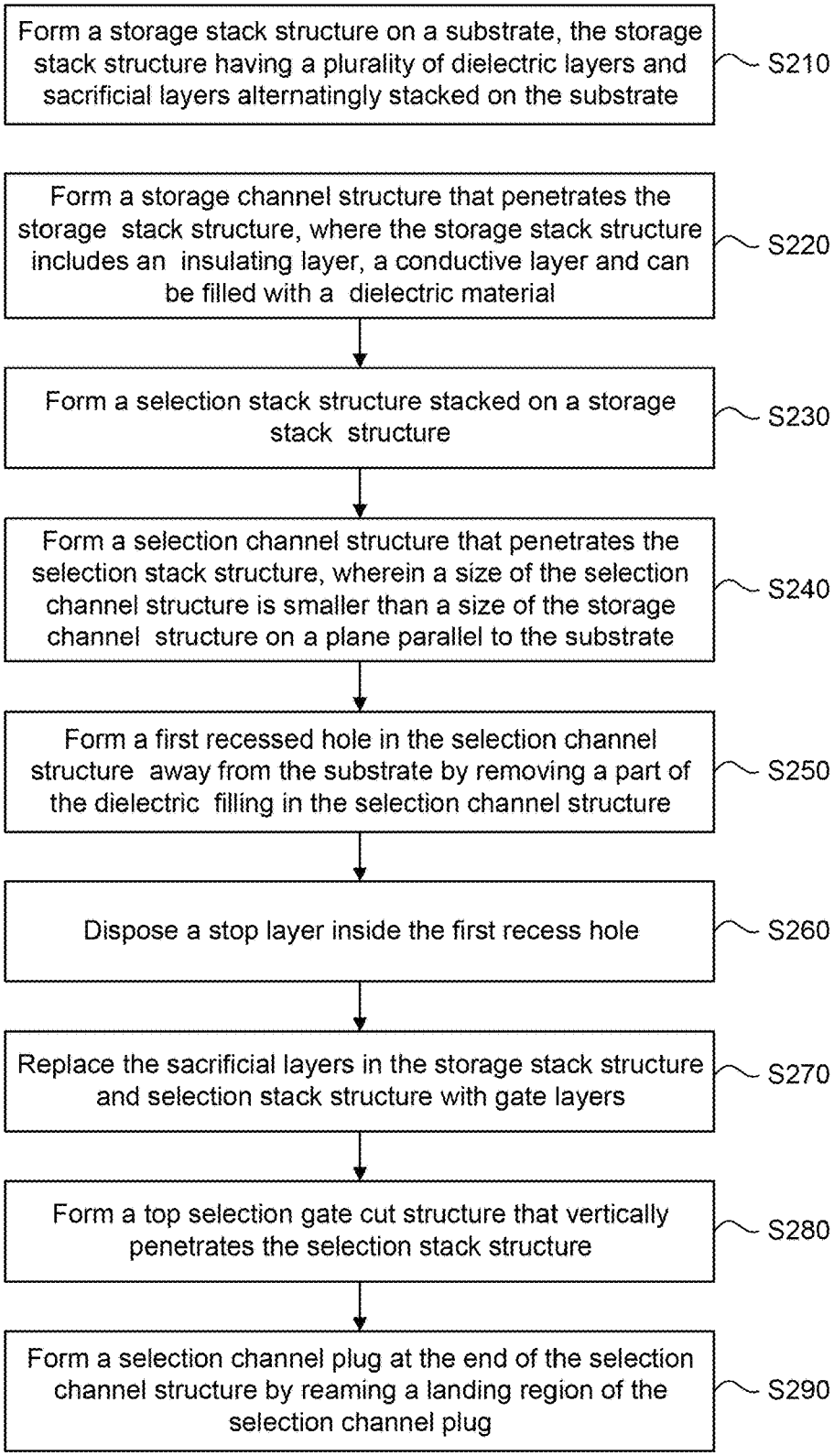
FIG. 2 illustrates a flowchart of the method of fabrication for a three-dimensional memory according to some embodiments of the present disclosure.

FIG. 1A illustrates step S210 and S220 of FIG. 2, which includes fabrication of a storage stack structure 120 on a substrate 110 and formation of a storage channel structure 130 that penetrates the storage stack structure. The storage stack structure can be fabricated in a substrate 110 that can be a single crystal silicon (Si) substrate, such as a single crystal germanium (Ge) substrate, a silicon-on-insulator (SOI) substrate, a germanium-on-insulator (GOI) substrate. The substrate 110 can also be a compound semiconductor such as gallium arsenide (GaAs) substrate, an indium phosphide (InP) substrate, a silicon carbide (SiC) substrate, or the like. The substrate 110 described in the present disclosure can also be prepared by using at least one of other semiconductor materials that would become apparent to persons skilled in the semiconductor arts.

The storage stack structure 120 shown in FIG. 1A can be formed on a first side of the substrate 110, and can include multiple dielectric layers 121 and multiple sacrificial layers 122 stacked along a second direction that is perpendicular to the substrate 110. The dielectric and sacrificial layers 121/122 can be alternately deposited by thin film deposition methods such as chemical vapor deposition (CVD), physical vapor deposition (PVD), atomic layer deposition (ALD) or any combination thereof. The material of the dielectric layer 121 can be silicon oxide and the material of the sacrificial layer 122 can be silicon nitride. In the storage stack structure 120, each of the multiple dielectric layers 121 and each of the multiple sacrificial layers 122 can have the same or different thicknesses, and can be set according to specific process requirements. Based on storage requirements of the three-dimensional memory, the storage stack can include a different number of stacked layers in the storage stack structure 120. This can result in a storage stack structure with different heights. Higher storage capacities require a larger number of stacked layers to form a greater number of memory units. The number of stacked layers are not limited in this disclosure and are typically of the order of 8, 32, 64, 120, or the like.

As illustrated in FIG. 1A, as part of step S220, A storage channel hole can be formed in the storage stack structure 120 by selective removal of the storage stack material using a dry or wet etching process, or the like. The process steps for patterning the storage selection hole are not explicitly disclosed herein, but can include selective film removal processes performed in material processing and device fabrication. The storage channel hole can extend vertically to the substrate 110 such that the substrate 110 can be exposed. Using thin film deposition techniques such as CVD, PVD, ALD or any combination thereof, multiple material layers can be formed on the sidewalls of the storage channel hole. As shown in FIG. 1A, the multiple layers sequentially formed on the sidewalls of the storage selection hole can be a functional layer 131 and a channel layer 132. The functional layer can be formed of but not limited to a barrier layer, a charge trap layer, a floating gate layer and a tunnel layer deposited in the same sequence as listed. In some embodiments, the multiple layers deposited on the sidewalls can form any suitable types of memory devices. For example, charge-trapping memory devices or floating-gate memory devices can be formed. The materials forming the barrier layer, charge trap layer and tunnel layer can include silicon oxide, silicon nitride and silicon oxide respectively. The channel layer 132 can be formed of polysilicon, for example. After forming the functional and channel layers on the sidewalls, the remaining storage channel hole can be filled with a dielectric material to form a dielectric core. The dielectric core can be formed of silicon dioxide, for example.

Optionally, a part of the filled dielectric material inside the storage channel at an end away from the substrate 110 can be etched back by using a dry or wet etching process to to form a recessed opening that exposes the channel layer 132. The recessed opening can be filled with a conductive material, thereby forming a storage channel plug 133 in contact with the channel layer 132. The storage channel plug 133 can be made of the same material as the channel layer 132, such as polysilicon, for example. The storage channel plug 133 can form an electrical contact with a corresponding selection channel structure formed in the subsequent process. While this same process method can be used to form multiple storage channel structures 130 in the storage stack structure 120, the number and arrangement of the storage channel structures 130 are not specifically limited in the present disclosure. As shown in FIG. 1A, the physical structure of the storage channel structure 130 can include a cylinder, a prism, a truncated cone and the like, and are not specifically limited in the present disclosure. In some embodiments, the selection channel structure 150 and the sub-storage channel structure can be a truncated mesa structure.

Figure 1B:
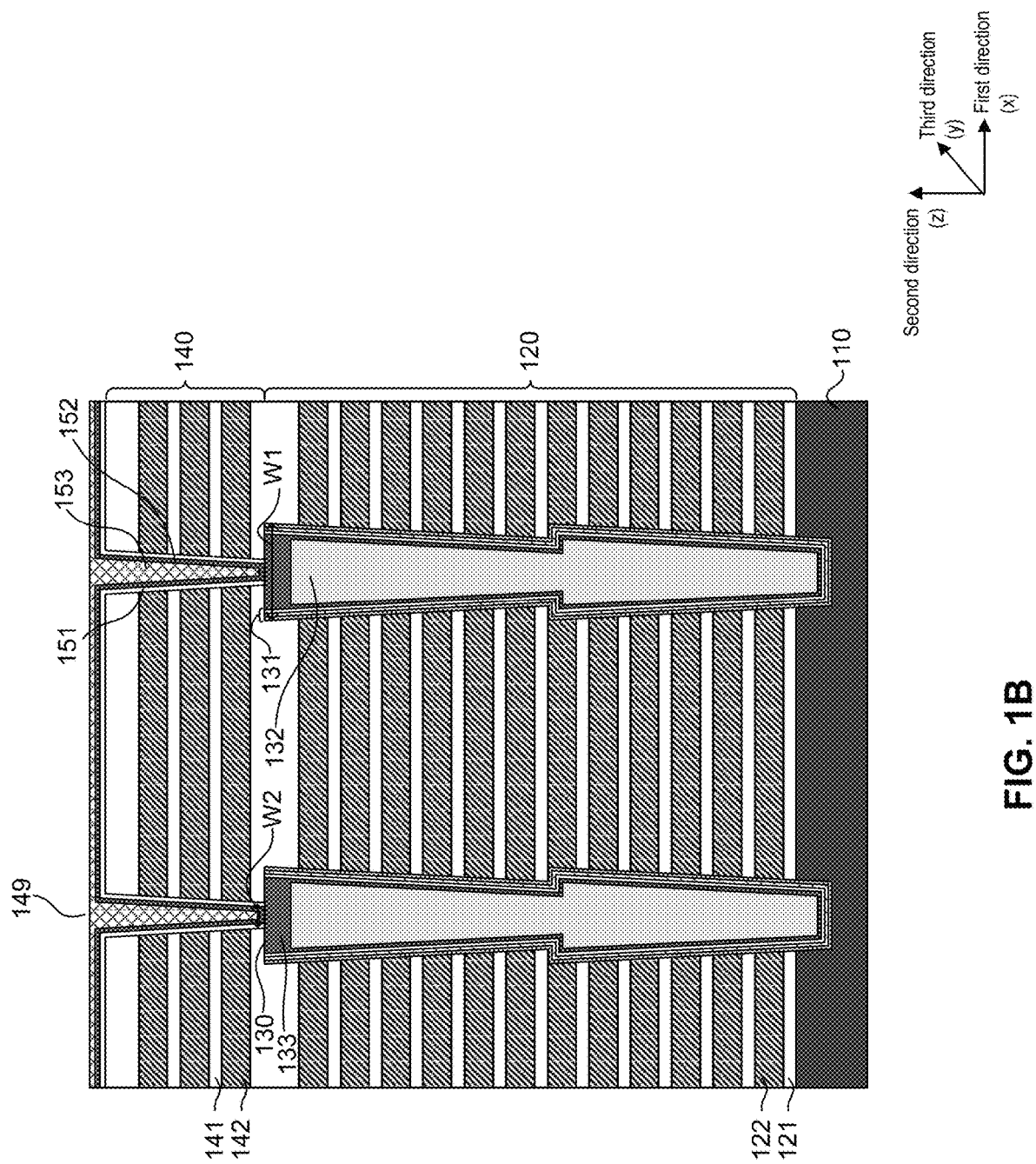

The method for fabricating one sub-storage stack structure and one sub-storage channel structure is described above. In some embodiments, the storage stack structure 120 can include multiple sub-storage stack structures, and the storage channel structure 130 can include multiple sub-storage channel structures. Correspondingly, during the process of forming multiple sub-storage channel structures, the storage channel hole can include multiple sub-storage channel holes, and multiple sub-storage stack structures can be in one-to-one correspondence with multiple sub-storage channel holes. Specifically, a first sub-storage stack structure can be formed on a first side of the substrate 110, and a first sub-storage channel hole that penetrates the first sub-storage stack structure and extends into the substrate 110 can be formed. Further, a nominal number of sub-storage stack structures and sub-storage channel holes can be subsequently formed on the first side. The remaining sub-storage channel holes except the last formed sub-storage channel hole are correspondingly filled with a hole-filling sacrificial layer. Further, the hole-filling sacrificial layers are removed on the basis of the last formed sub-storage channel hole, so that upper and lower adjacent sub-storage channel holes in the predetermined number of sub-storage channel holes are at least partially aligned with each other, thereby obtaining a storage channel hole. As shown in FIG. 1B, step S230 includes formation of the selection stack structure 140 stacked on top of the storage stack structure 120. The selection stack structure can include multiple dielectric layers 141 and multiple sacrificial layers 142 that are alternately stacked. The material of the dielectric layer 141 can be, for example, silicon oxide and the material of the sacrificial layer 142 can be, for example, silicon nitride. The multiple dielectric layers 141 and multiple sacrificial layers 142 can have the same or different thicknesses, and can be set according to specific process requirements. Different three-dimensional memory structures can have a different number of stacked layers including the selection stack structure and correspondingly different stacking heights.

Step S240 includes the method to form a selection channel structure that penetrates the selection stack structure (shown in FIG. 1B). To form the selection channel structure 150, a selection channel hole can be formed in the selection stack structure 140 by using, for example, a dry or wet etching process. The selection channel hole 149 can penetrate perpendicularly to the storage channel structure 130 to expose the storage channel structure 130. The selection channel hole 149 can expose the storage channel plug 133.

Further, an insulating layer 151 can be formed on an inner side-wall of the selection channel hole 149 by using a thin film deposition process such as CVD, PVD, ALD or any combination thereof. In some embodiments, the insulating layer 151 can also be formed on the bottom of the selection channel hole 149. The material of the insulating layer 151 can include silicon oxide. During the process of preparing the insulating layer 151, the insulating layer 151 can be formed on a surface of the selection stack structure 140 at an end away from the substrate 110. After the above process treatment, a part of the insulating layer 151 located at the bottom of the selection channel hole 149 can cover the exposed storage channel plug 133.

The insulating layer 151 located at the bottom of the selection channel hole 149 can be removed by using a dry or wet etching process to expose the storage channel plug 133 again, so that the insulating layer 151 can cover the inner side walls of the selection channel hole 149. During this etching process, the insulating layer on the surface of the selection stack structure 140 at an end away from the substrate 110 can also be removed.

Further, a conductive material layer 152 can be formed on a sidewall surface of the insulating layer 151 and a surface of the bottom of the selection channel hole 149 by using a thin film deposition process such as CVD, PVD, ALD or any combination thereof. The material of the conductive layer 152 can include doped polysilicon. The conductive layer 152 can also be formed on a surface of the insulating layer 151 on a side of the selection stack structure 140 away from the substrate 110. After the above process treatment, the conductive layer 152 can cover the inner wall of the selection channel hole 149 and be in contact with the storage channel plug 133, to form an electrical contact region with the storage channel plug 133. In some embodiments, horizontal portions of insulating layer 151 and conductive layer 152 formed on top surfaces of selection stack structure 140 can be removed using suitable fabrication processes, such as a chemical-mechanical polishing (CMP) process. In some embodiments, the horizontal portions of insulating layer 151 can be removed when portions of insulating layer 151 at the bottom of the selection channel hole 149 are removed.

As illustrated in FIG. 1B, in some embodiments, the selection channel hole 149 that already has the insulating layer 151 and the conductive layer 152 are formed can be filled with a dielectric material by using a thin film deposition process such as CVD, PVD, ALD or any combination thereof, to form an insulating filling layer 153. The insulating filling layer 153 can be made of silicon oxide. During the process of preparing the insulating filling layer 153, the insulating filling layer 153 can be formed on the surface of the conductive layer 152 on the top surface of the selection stack structure 140 away from the substrate 110.

The same process method can be used to form multiple selection channel structures 150 in the selection stack structure 140, and the positions of the selection channel structures 150 are in one-to-one correspondence with the positions of the storage channel structures 130. In other words, each selection channel structure 150 is physically and electrically connected to the storage channel structure 130 below it. The conductive material layer 152 at the bottom of the selection channel structure physically and electrically contacts the storage channel plug 133. In addition, at the interface connecting the selection channel structure and the storage channel structure in the first direction, the bottom of the selection channel structures 150 have a width W2 smaller than the width W1 of the top of the storage channel structures 130. Reducing the width W2 for the selection channel structure compared to the width W1 of the corresponding storage channel structure can allow a larger process window for forming the TSG cut structure in the selection stack structure. In addition, the fabrication method disclosed herein can provide the benefits of, among other things, improving storage density by decreasing the distance between the storage channel structure rows.

Based on a cross-sectional view, shapes of the selection channel structure 150 and the storage channel structure 130 can include a cylinder, a prism, a truncated cone and the like, and are not specifically limited in the present disclosure. In some embodiments, a suitable cross-sectional shape of selection channel structure can be achieved by utilizing suitable process parameters for the one or more etching processes that form the selection channel holes 150. In some embodiments, the selection channel structure 150 and the sub-storage channel structure can be a truncated mesa structure. The selection channel structure 150 and the sub-storage channel structure have a width that gradually decreases along a second direction toward the substrate, and a maximum width of the selection channel structure 150 can be smaller than a maximum width of the sub-storage channel structure. Exemplarily, the maximum width W3 of the selection channel structure 150 can be smaller than the maximum width W1 of the sub-storage channel structure. After the above process treatment, the space occupied by the selection channel structure 150 in the selection stack structure 140 can be reduced, which is advantageous to provide a larger process window for the TSG cut structure, formed in the selection stack structure.

Figure 1C:
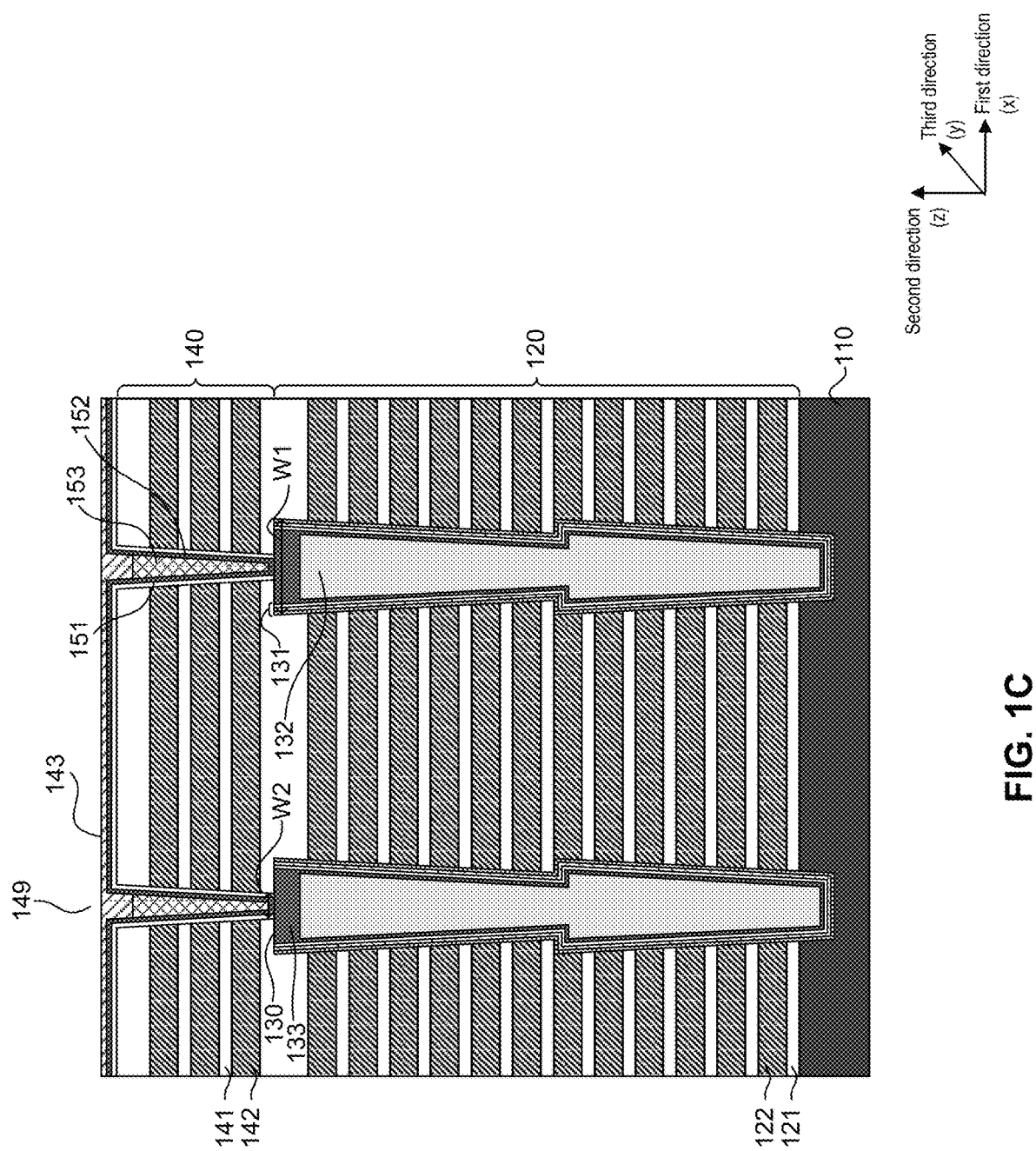

Further, as illustrated in FIG. 1C, the method in step S250, can include forming a first opening in the selection channel structure at an end away from the substrate. In some embodiments, the fabrication method 200 can include a step of forming a stop layer 143 at an end part of the selection channel structure 150 away from the substrate 110. Specifically, for example, a dry or wet etching process can be used to remove a part of the dielectric filling layer 153 in the selection channel structure 150 away from the substrate 110 and a part located in the selection stack structure 140 away from the substrate 110 to form a first opening that exposes the conductive layer 152. The first opening can also be used to form a selection channel plug in a subsequent process. The first opening can extend in the dielectric layer 141 in the selection stack structure 140 instead of extending into the sacrificial layer 142.

Further, as included in step S260, the stop layer 143 (shown in FIG. 1C) can be formed in the first opening by using a film deposition process such as CVD, PVD, ALD or any combination thereof. During the process of forming the stop layer 143, the stop layer 143 can be formed on a surface of the conductive layer 152 on the side of the selection stack structure 140 away from the substrate 110. The stop layer 143 can be made of but not limited to, for example, silicon nitride.

Figure 1D:
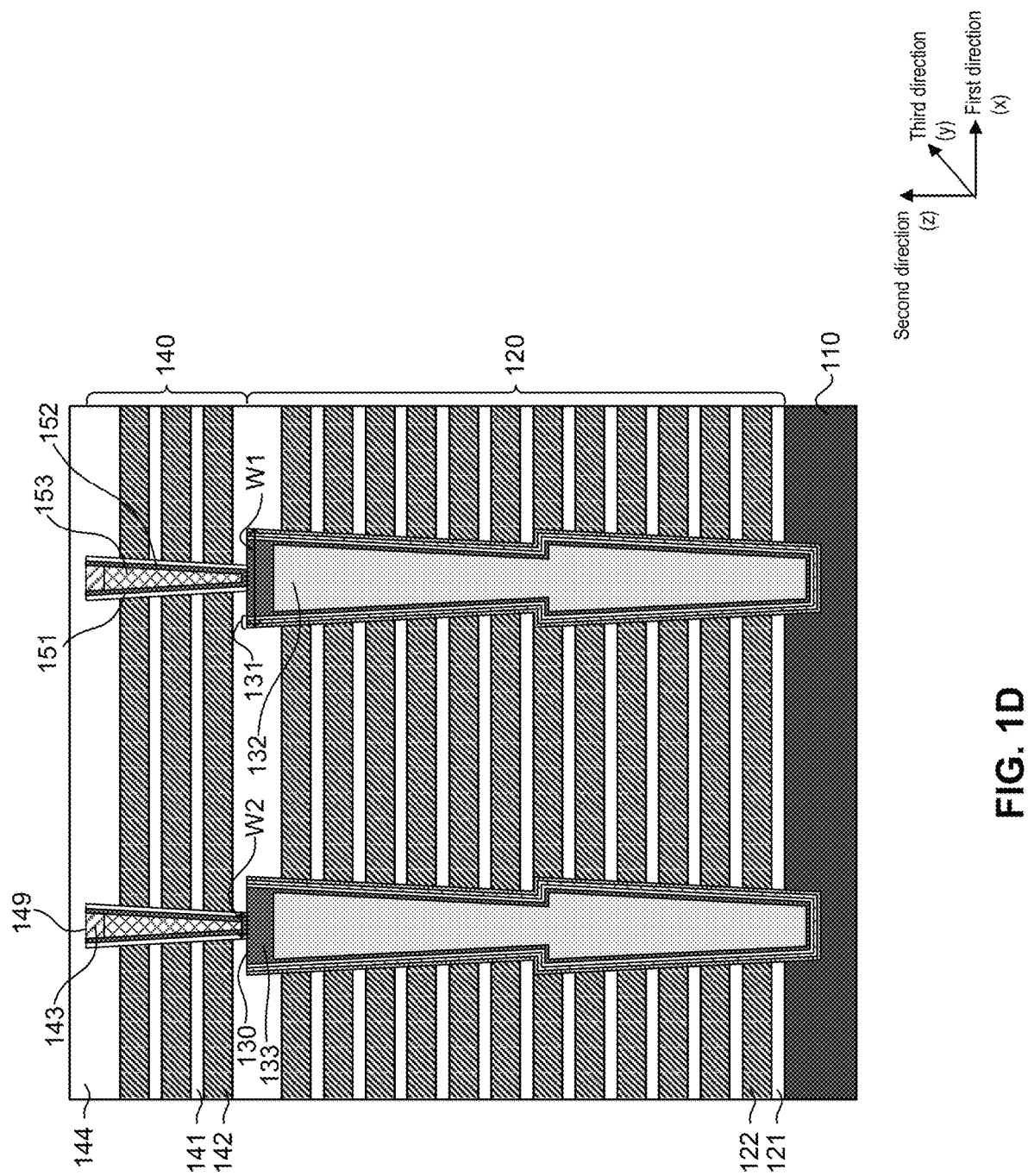
Figure 1E:
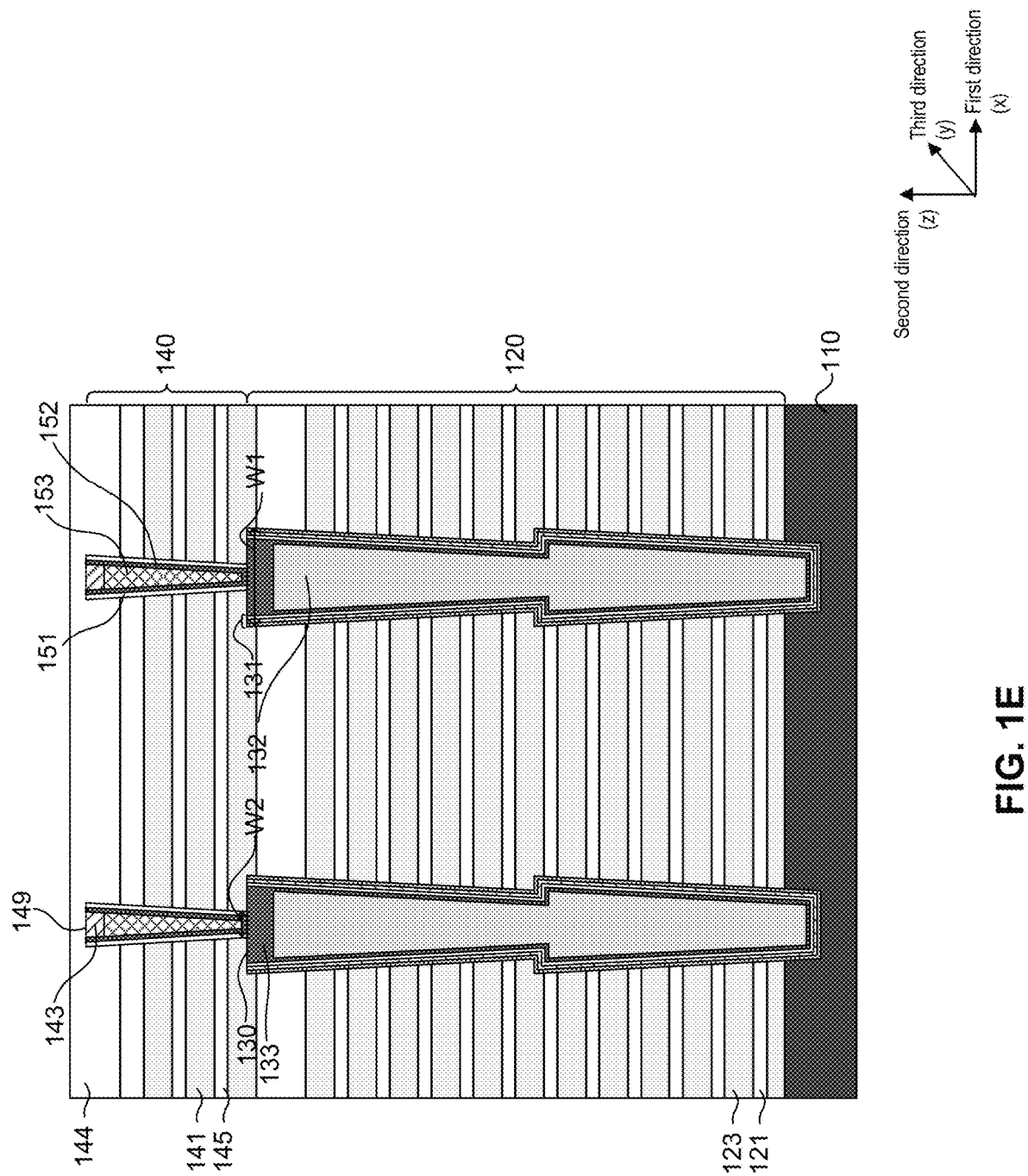

In some embodiments, as shown in FIG. 1D, for example, an etching process or a chemical mechanical polishing (CMP) process can be used to remove the stop layer 143, the conductive layer 152, and a part of the insulating layer 151 located on a surface of the selection stack structure 140 away from the substrate 110 in sequence to expose the selection stack structure 140. Further, a capping layer 144 can be formed on the side of the selection stack structure 140 away from the substrate 110 by using a thin film deposition process such as CVD, PVD, ALD or any combination thereof, to cover the stop layer 143 located in the selection channel structure 150 and the surface of the selection stack structure 140 away from the substrate 110. In some embodiments, the capping layer 144 can be made of silicon oxide.

In some embodiments, the fabrication method 200 for the three-dimensional memory provided in the embodiments of the present application can further include a step of performing a "gate replacement" operation.

In step S270 a method to replace the sacrificial layers in the storage stack structure and selection stack structure with gate layers has been included. A dry or wet etching process can be used to form a gate line slit (GLS) (not shown in FIG. 1E) that can vertically penetrate the selection stack structure 140 and the storage stack structure 120 and extends to the substrate 110. Further, the GLS formed after the above process can be used as a channel for an etchant, and a wet etching process, to remove the sacrificial layer 142 in the selection stack structure 140 and the sacrificial layer 122 in the storage stack structure 120 to form multiple sacrificial gaps. The etch selectivity between the dielectric layer and sacrificial layer allows the sacrificial layer to be removed selectively. Therefore, due to the etch selectivity between the dielectric layers 121 and the sacrificial layers 122 in the storage stack structure 120, the sacrificial layer 122 can be removed selectively. Similarly, due to the etch selectivity between the dielectric layer 141 and the sacrificial layer 142 in the selection stack structure 140 allows the sacrificial layer 142 to be removed selectively. Further, a thin film deposition process such as CVD, PVD, ALD or any combination thereof can be used to fill in the sacrificial gap with a conductive material so as to form gate layers 123 and 145. The gate layers 123 and 145 can be made of tungsten, cobalt, copper, aluminum, doped crystalline silicon, or the like. The gate layers can constitute the word lines.

Although the present disclosure adopts the implementation in which the sacrificial layers 122 and 142 are subsequently replaced by the filled conductive material to form the gate layer, the implementation in which the gate layer is formed in the present disclosure is not limited to this. It can also be implemented by, directly alternately stacking a dielectric layer and a gate layer made of a conductive material.

After the above process treatment, at the selection stack and selection channel level, the insulating layer 151 and the conductive layer 152 corresponding to the sacrificial layer 142 in the selection channel structure 150 can form a top selection transistor. The structure of the top selection transistor using a MOS transistor can improve the stability of the threshold voltage of the top selection transistor and improve the reliability of the top selection transistor.

Figure 1F:
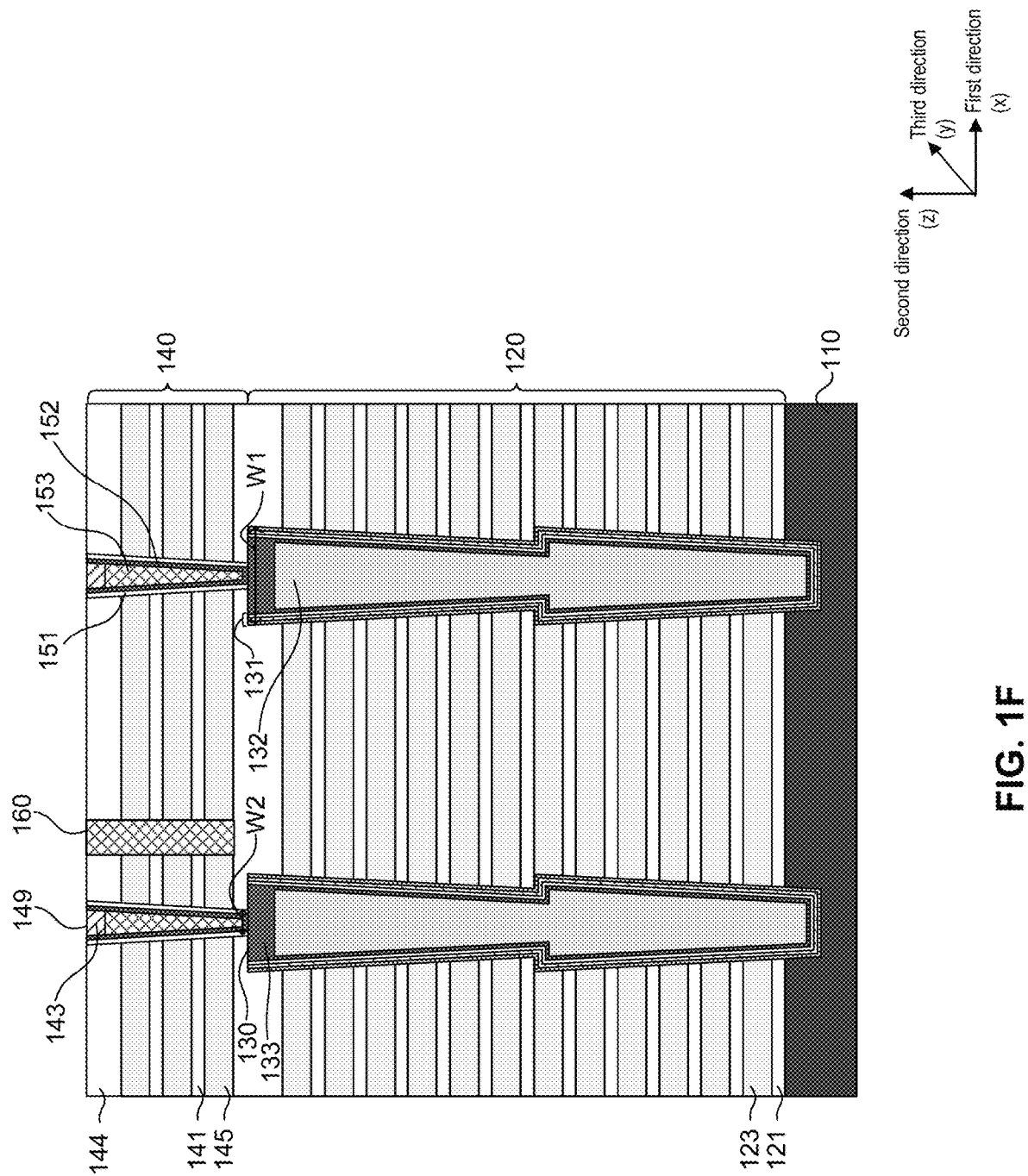

As shown in FIG. 1F in Step S280, a dry or wet etching process can be used to form a TSG cut situated between adjacent channel structures 140 and penetrating the selection stack structure 140 in a direction perpendicular to the substrate 110. In some embodiments, a TSG cut that penetrates the capping layer 144 to a dielectric layer 141 can be formed. In some embodiments, the TSG cut can penetrate any suitable layers of selection stack structure 140. A thin film deposition process such as CVD, PVD, ALD or any combination thereof can be used to deposit a dielectric material such as silicon oxide or silicon nitride, for example, in the TSG cut, thereby forming a TSG cut structure 160. In some embodiments, the deposited dielectric material can be formed of any suitable dielectric materials. For example, the deposited dielectric material of TSG cut structure 160 can be formed using a material that is different from stop layer 143. The TSG cut structure 160 can divide a storage block formed by an array of selection channel structures 150 and corresponding storage channel structures 130 into multiple sub-storage blocks. The gate layer 145 located in the selection stack structure 140 can be configured to independently control a corresponding top selection transistor, so that the prepared three-dimensional memory can accurately control the desired sub-storage blocks. Forming TSG cut structures can provide various benefits, including but not limited to, a reduction in programming, reading and erasing time and data transmission time as well as improvements in the data storage efficiency.

Figure 3:
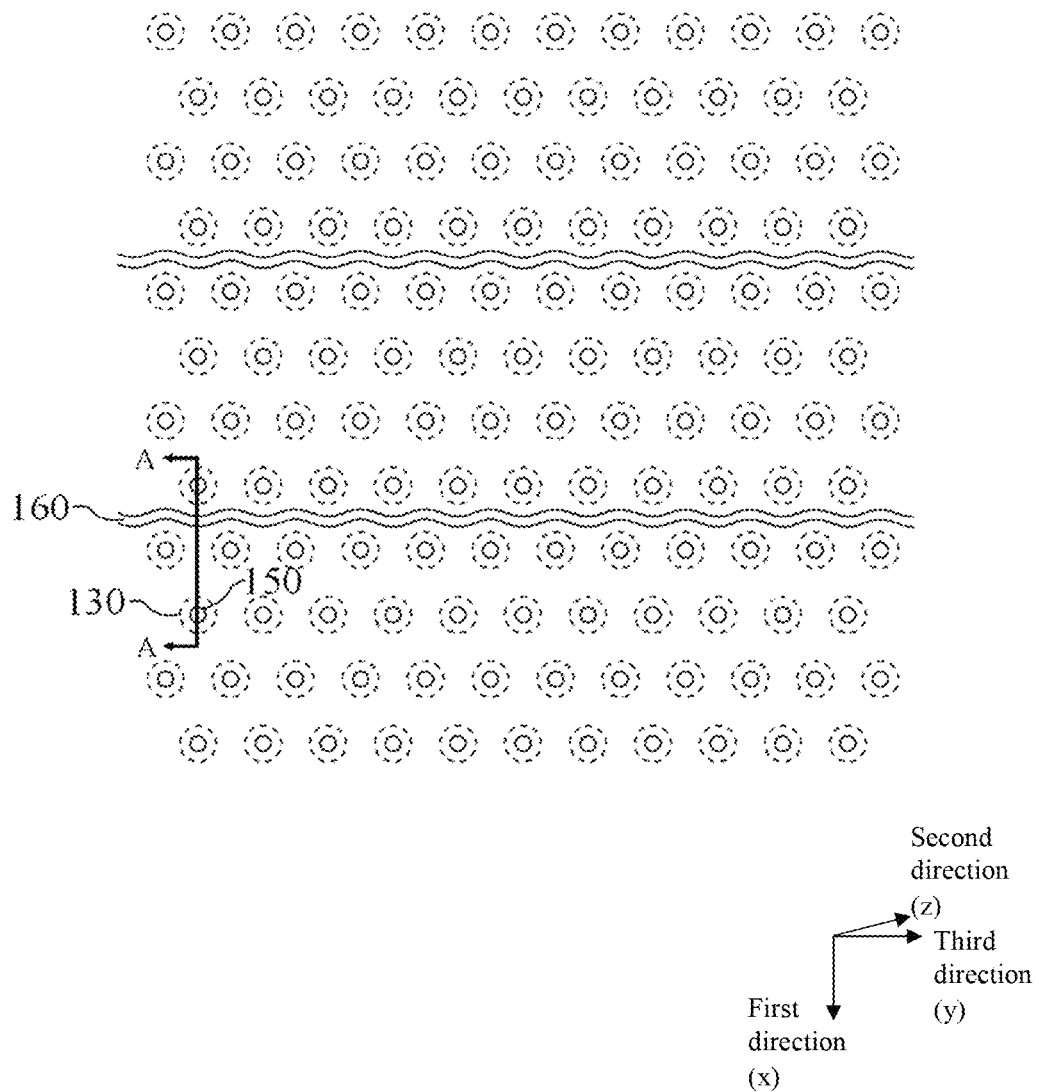
FIG. 3 illustrates a top view of the three-dimensional memory of FIG. 1F, in accordance with some embodiments of the present disclosure.

FIG. 3 is a schematic structural top view of the three-dimensional memory of FIG. 1F. In some embodiments, as shown in FIG. 3, multiple selection channel structures 150 and corresponding storage channel structures 130 can be staggered and arranged in rows in a third direction (y-axis). The TSG cut structure 160 can extend between adjacent rows of selection channel structures. In other words, the TSG cut structure 160 can extend in the y-axis direction. In some embodiments, the shape of the TSG cut structure 160 on a plane parallel to the substrate 110, that is, on a plane formed by the first direction and third direction (x-y plane), can be wavy. The wave shape allows the top select gate structure 160 to wind around the staggered selection channel structures 130 in adjacent rows in a plane formed by the first direction and third direction (x-y plane). This wave shaped TSG can better avoid the overlapping region between the selection channel structure 130 and the TSG cut structure 160, thereby increasing the storage density.

The shape of the TSG cut structure 160 on the plane formed by the first direction and third direction that is, on the x-y plane, can also be other shapes, and it is not specifically limited in the present application.

Figure 4:
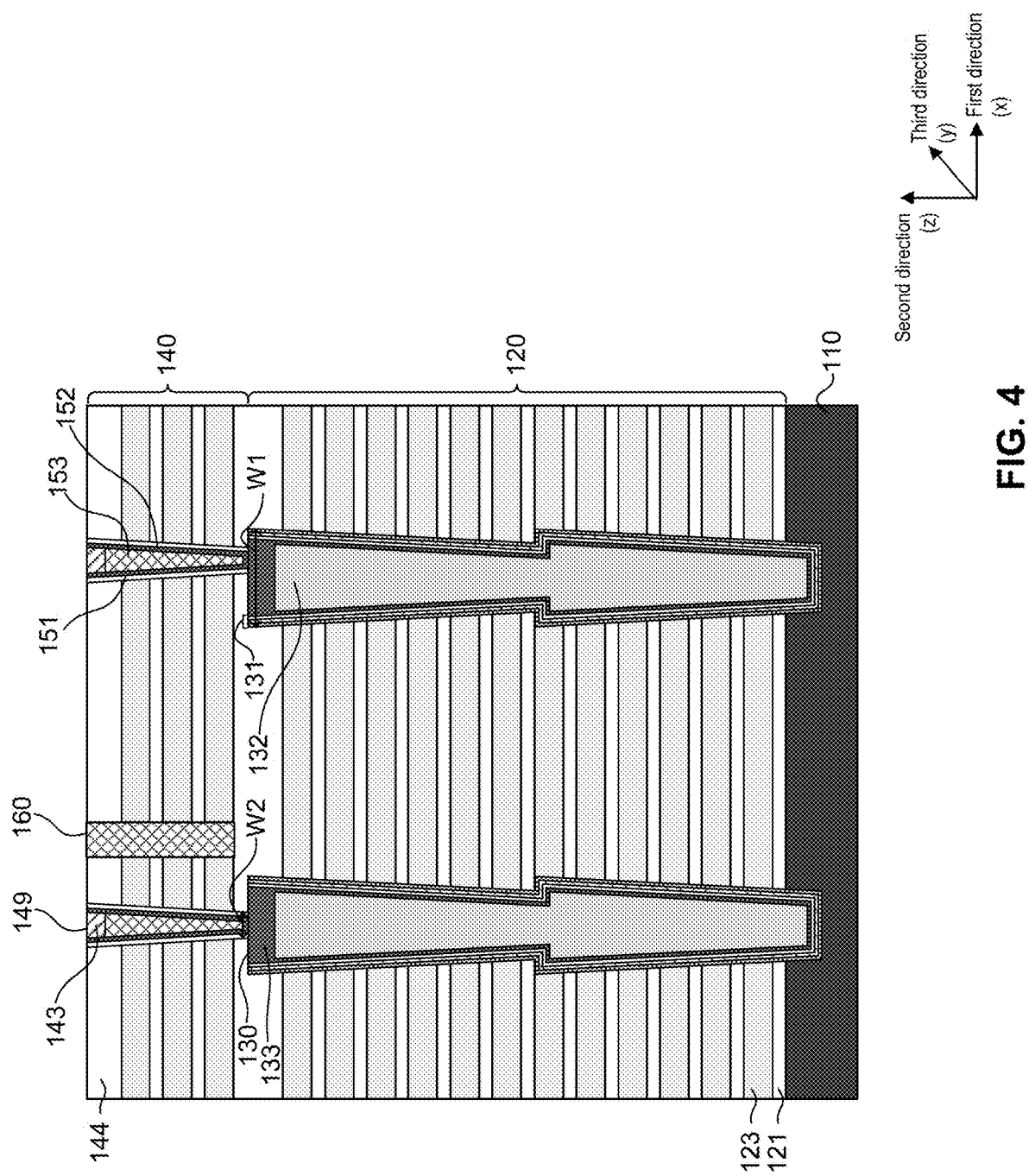
FIG. 4 illustrates a schematic structural view of a method for fabricating a three-dimensional memory in accordance according to another embodiment of the present application.
Figure 5:
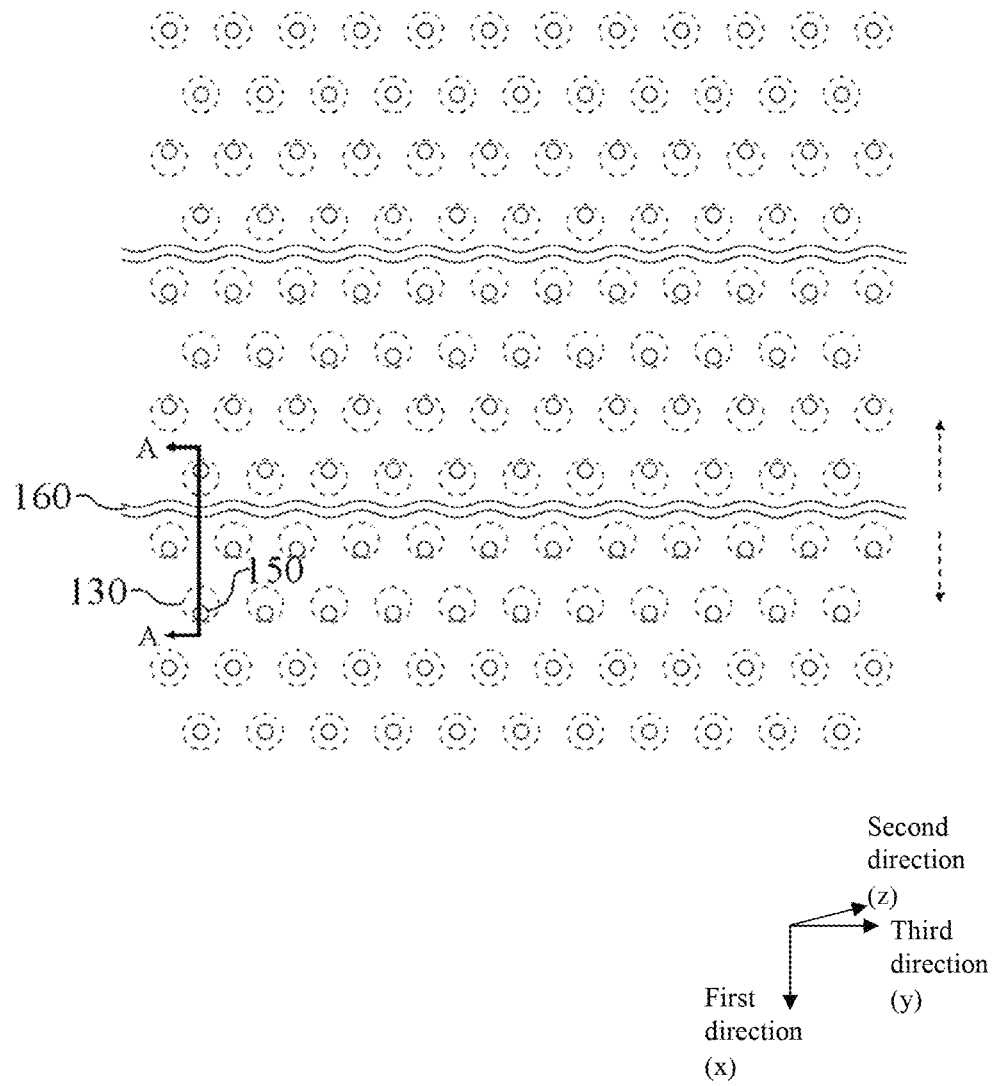
FIG. 5 is a top view of the three-dimensional memory of FIG. 4, in accordance with some embodiments of the present disclosure.

The center to center alignment of the selection channel structure and the storage channel structure can reduce in the first direction, the nearest distance between the TSG cut structure 160 and the selection channel structure 150. The width W3 of the selection channel can be made smaller than the width W1 of the storage channel structure which enlarges the space reserved for the TSG cut structure and improves the process window. Additionally, shifting the selection channel structure 150 off-axis with respect to the storage channel structure 130 in a direction away from the top select gate cut structure increases the distance between the top select gate cut structure 160 and the selection channel structure 150. This off-axis shift also helps improve the process window for the formation of the top select gate cut structure 160. FIG. 4 is a schematic structural view of a three-dimensional memory according to another embodiment of the present application. FIG. 5 is a schematic structural top view of the three-dimensional memory of FIG. 4. As illustrated in FIG. 5, the number of selection channel rows between two adjacent TSG cut structures is not limited. As shown in FIGS. 4 and 5, in a process of forming the selection channel structures 150, selection channel structures 150 in at least one selection channel structure row located on both sides of the TSG cut structure 160 can be arranged off-axis relative to corresponding storage channel structures 130 in a second direction. The distance between the axis of the selection channel structure 150 in the at least one selection channel structure row and the TSG cut structure 160 is greater than the distance between the storage channel structure 130 connected to the selection channel structure 150 and the TSG cut structure 160. The off-axis deviation between the axis of the selection channel and the axis of the connected storage channel ensures physical and electrical contact between the conductive layer 152 of the selection channel and the storage channel plug 133. Exemplarily, where the number of selection channel structure rows between adjacent TSG cut structures 160 is 4, the axes of the selection channel structures 160 in two selection channel structure rows located on both sides of the TSG cut structure 160 are arranged off-axis relative to the axes of the storage channel structures 130. In this way, the process window of the TSG cut structure 160 can be increased without reducing the size of the selection channel structure 150 and the TSG cut structure 160. It should be understood that the number of selection channel structure rows between adjacent TSG cut structures is not specifically limited in the present application. Therefore, the number of selection channel structure rows that are arranged off-axis is not limited to 2. In a case where the number of off-axis selection channel structure rows is less than or equal to half of the number of selection channel structure rows between adjacent TSG cut structures, the process window for selecting the TSG cut structures can be increased.

In some embodiments, as shown in FIG. 1F, a CMP process, for example, can be used to remove a capping layer 144 located on a side of the selection stack structure 140 away from the substrate 110. The stop layer 143 located at an end of the selection channel structure 150 away from the substrate 110 can act as the etch stop layer, thereby reducing damage to the selection channel structure 150 during the process of removing the cap layer 144 This prevents adversely affecting the electrical performance of the prepared three-dimensional memory.

In some embodiments, the fabrication method 200 of the three-dimensional memory can further include a step S290 for forming a selection channel plug. Without the reamed selection channel plug the largest width W3 of the selection channel hole 149 is not conducive for landing. The selection channel plug can be formed at an end of the selection channel structure 150 away from the substrate. The selection channel plug can be formed to contact the conductive layer 152.

Figure 1G:
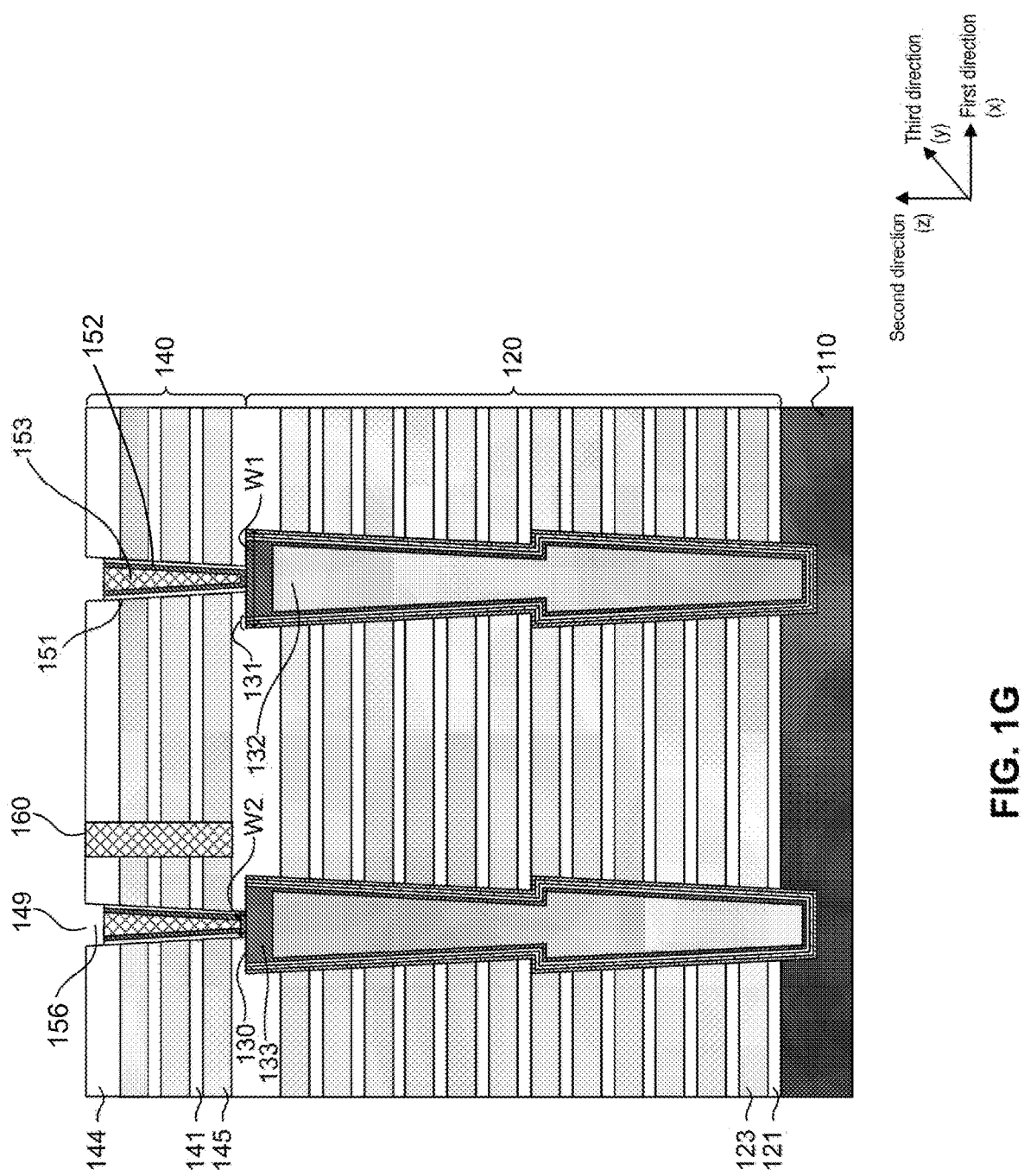
Figure 1H:
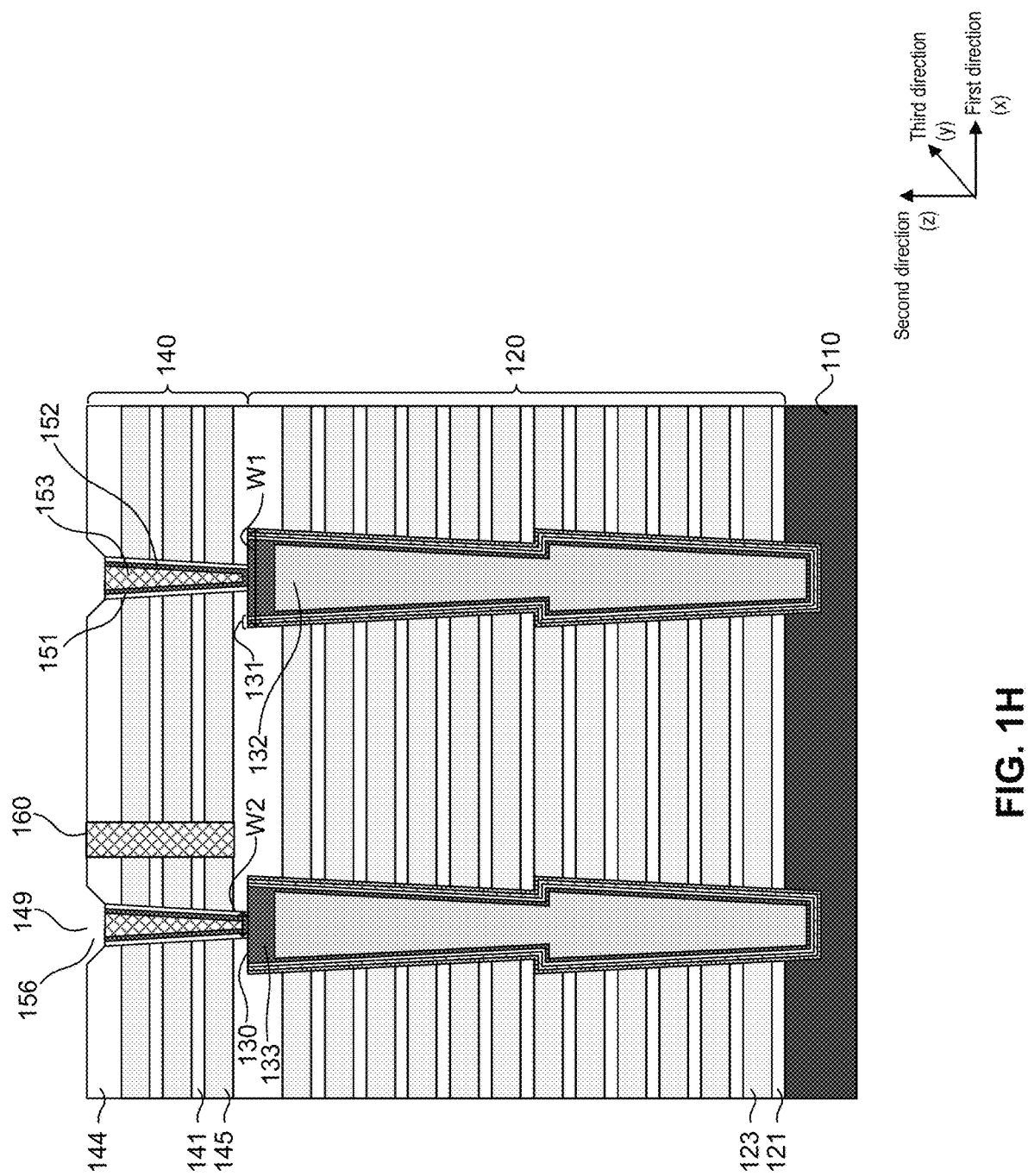
Figure 1J:
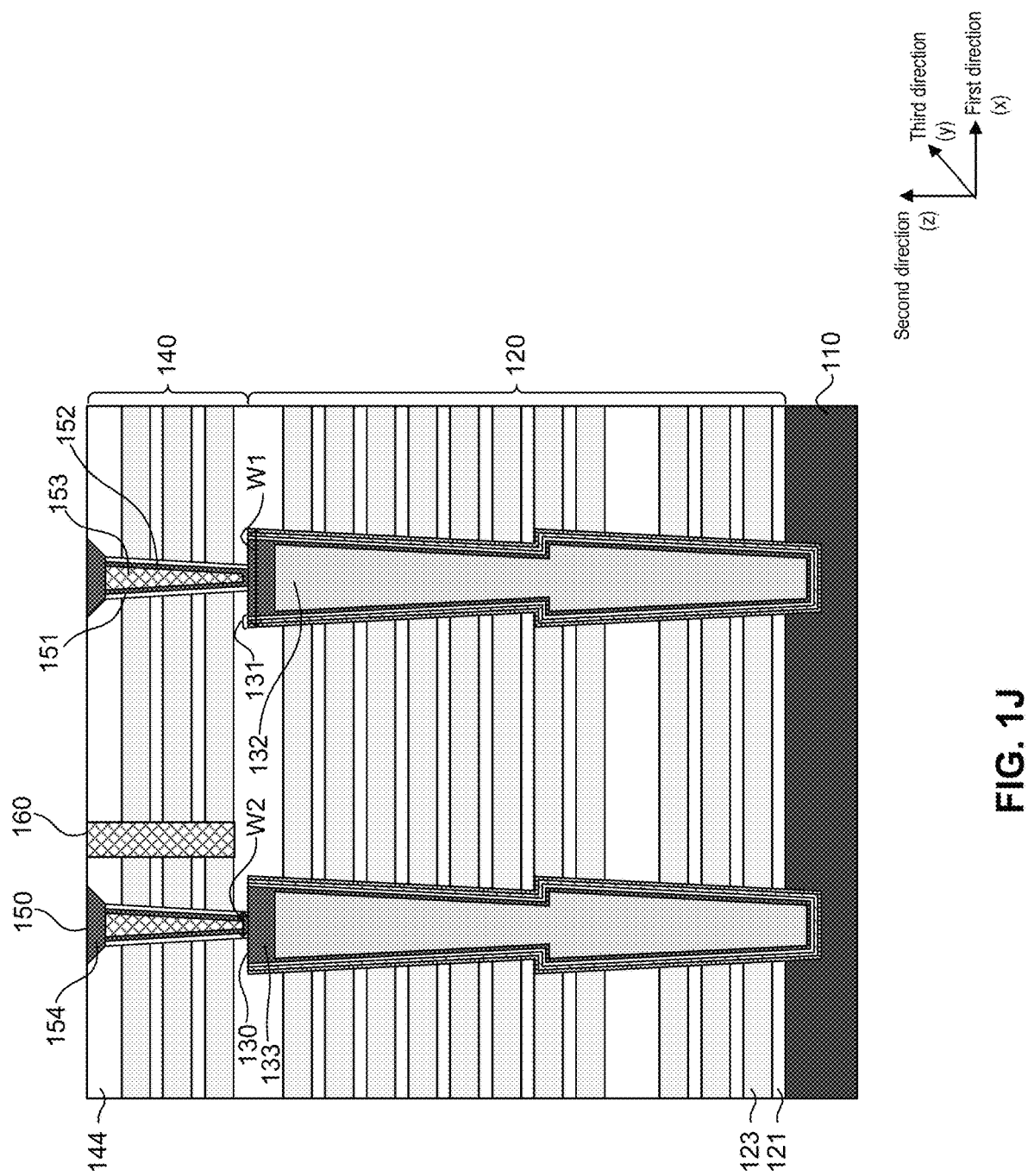

As shown in FIG. 1G, a dry or wet etching process, for example, can be used to remove the stop layer 143, parts of the conductive layer 152 and insulating layer 151 corresponding to the stop layer 143 to form a second recessed opening 156 exposing an end surface of the conductive layer 152. Further as shown in FIG. 1H, a dry or wet etching process, for example, can be used to ream the second recessed opening 156, so that the width W4 of the top of the second recessed opening in the first direction is larger than the width W3 of the selection channel structure 150 in the first direction. Further, a conductive material is filled in the second recessed opening that has been reamed to form the selection channel plug 154 as shown in FIG. 1J. The selection channel plug 154 can be made of the same material as the conductive layer 152. By means of reaming the second recessed hole, a landing region of the selection channel plug located in the second recessed opening can be increased. Using the reaming technology to enlarge the landing site at the top of the selection channel can improve the design flexibility of the channel hole layout and accommodate any suitable number of channel hole structures, such as 9-hole structures, 12 hole structures, 16 hole structures, 20 hole structures, or the like.

Figure 1K:
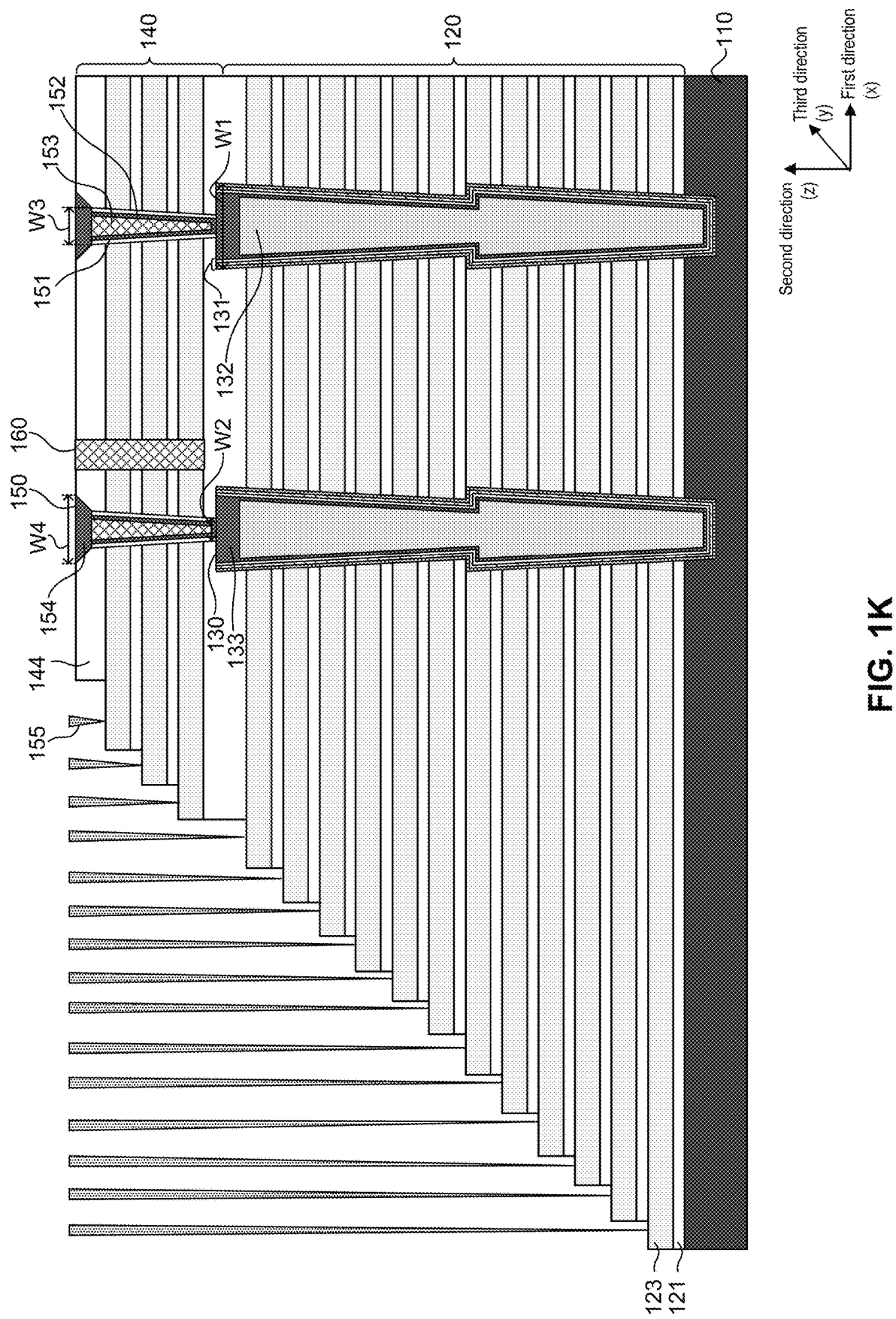

In some embodiments, vertical word line contacts to connect each gate layer of the memory structure to the peripheral circuits can be formed. FIG. 1K shows a staircase structure 146 formed by multiple alternating dielectric layers 121 and gate layers 123. Word line contacts 155 can be formed to contact each gate layer in the staircase structure 146. To form each word line contact an opening can be formed in the second direction (through etching techniques). Using deposition techniques such as atomic layer deposition (ALD), chemical vapor deposition (CVD), physical vapor deposition (PVD), electrochemical depositions, or any combination thereof, the created opening can be filled with a conducting material to form the word line contact along the second direction.

In some embodiments, the three-dimensional memory formed after the above process can be flipped to perform a step of removing the substrate 110. In this step, a dry or wet etching process, for example, and a CMP process can be used to remove the substrate 110 to form an electrical contact region in contact with a channel layer 132 from a back side of the substrate 110. In some embodiments, after the substrate 110 is removed, a part of a functional layer 131 in the storage channel structure 130 extending to the substrate 110 can be further removed to expose the channel layer 132. Further, on a side of the storage stack structure 120 away from the selection stack structure 140, a semiconductor layer surrounding a part of the channel layer 132 extending from the storage stack structure 120 is formed, and the semiconductor layer and the channel layer 132 can form an electrical contact region.

Since the content and structure involved in the description of the fabrication method 200 above can be fully or partially applicable to the three-dimensional memory described here, the content related or similar to it will not be repeated.

The above description includes some exemplary aspects and implementations of the present application and the explanation of the applied technical principle. It should be understood by those skilled in the art that the scope of invention involved in the present application is not limited to technical solutions formed by specific combinations of the above technical features, and at the same time, should also cover other technical solutions formed by any combination of the above technical features or equivalent features thereof without departing from the concept of the invention. For example, the above features and (but not limited to) the technical features with similar functions disclosed in the present application are replaced with each other to form technical solutions.

Figure 6:
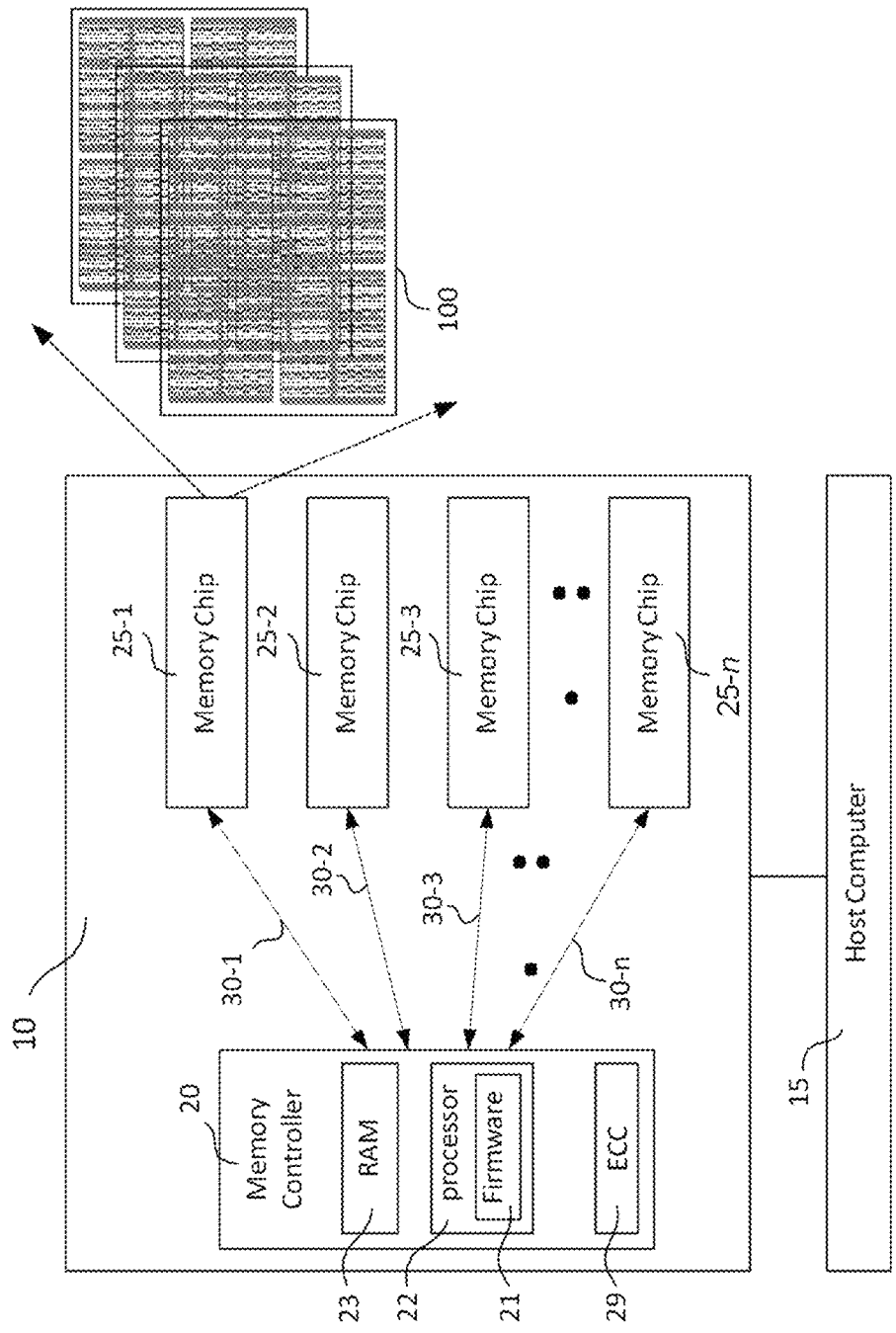
FIGS. 6 and 7A-7B illustrate a storage system with one or more memory chips, according to some embodiments of the present disclosure.

FIG. 6 illustrates a block diagram of an exemplary system S1 having a storage system 10, according to some embodiments of the present disclosure. System S1 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. The storage system 10 (also referred to as a NAND storage system) can include a memory controller 20 and one or more semiconductor memory chips 25-1, 25-2, 25-3, . . . , 25-n. Each semiconductor memory chip 25 (hereafter just "memory chip") can be a NAND chip (i.e., "flash," "NAND flash" or "NAND"). The storage system 10 can communicate with a host computer 15 through the memory controller 20, where the memory controller 20 can be connected to the one or more memory chips 25-1, 25-2, 25-3, . . . , 25-n, via one or more memory channels 30-1, 30-2, 30-3, . . . , 30-n. In some embodiments, each memory chip 25 can be managed by the memory controller 20 via a memory channel 30.

In some embodiments, the host computer 15 can include a processor of an electronic device, such as a central processing unit (CPU), or a system-on-chip (SoC), such as an application processor (AP). The host computer 15 sends data to be stored at the NAND storage system or storage system 10 or retrieves data by reading the storage system 10.

The memory controller 20 can handle I/O requests received from the host computer 15, ensure data integrity and efficient storage, and manage the memory chip 25. To perform these tasks, the controller runs firmware 21, which can be executed by one or more processors 22 (e.g., microcontroller units, CPU) inside the controller 20. For example, the controller 20 runs firmware 21 to map logical addresses (i.e., address utilized by the host associated with host data) to physical addresses in the memory chip 25 (i.e., actual locations where the data is stored). The controller 20 also runs firmware 21 to manage defective memory blocks in the memory chip 25, where the firmware 21 can remap the logical address to a different physical address, i.e., move the data to a different physical address. The controller 20 can also include one or more memories 23 (e.g., DRAM, SRAM, EPROM, etc.), which can be used to store various metadata used by the firmware 21. In some embodiments, the memory controller 20 can also perform error recovery through an error correction code (ECC) engine 29. ECC is used to detect and correct the raw bit errors that occur within each memory chip 25.

The memory channels 30 can provide data and control communication between the memory controller 20 and each memory chip 25 via a data bus. The memory controller 20 can select one of the memory chip 25 according to a chip enable signal.

In some embodiments, each memory chip 25 in FIG. 6 can include one or more memory dies. In some embodiments, each of the one or more memory dies can include the memory structure shown in FIG. 1K, which can be fabricated using the method described in FIG. 2.

Figure 7A:
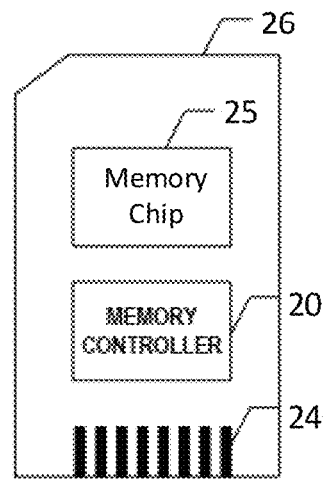
Figure 7B:
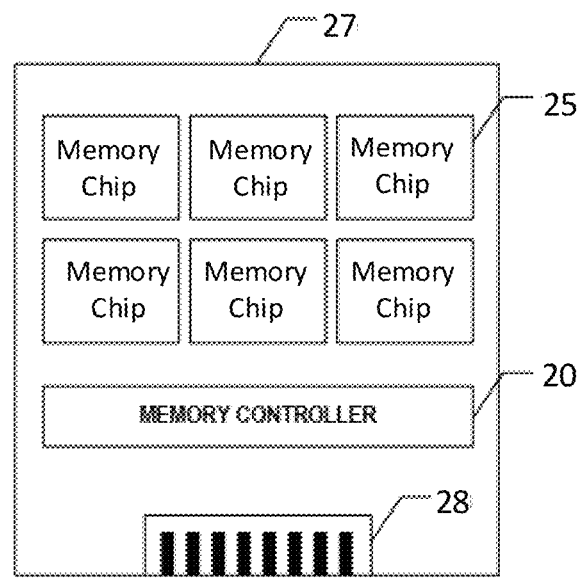

Memory controller 20 and one or more memory chip 25 can be integrated into various types of storage devices, for example, be included in the same package, such as a universal Flash storage (UFS) package or an eMMC package. That is, storage system 10 can be implemented and packaged into different types of end electronic products. In one example as shown in FIG. 7A, memory controller 20 and a single memory chip 25 can be integrated into a memory card 26. Memory card 26 can include a PC card (PCMCIA, personal computer memory card international association), a CF card, a smart media (SM) card, a memory stick, a multimedia card (MMC, RS-MMC, MMCmicro), an SD card (SD, mini SD, microSD, SDHC), a UFS, etc. Memory card 26 can further include a memory card connector 24 coupling memory card 26 with a host (e.g., the host computer 15 in FIG. 6). In another example as shown in FIG. 7B, memory controller 20 and multiple memory chip 25 can be integrated into a solid state drive (SSD) 27. SSD 27 can further include an SSD connector 28 coupling SSD 27 with a host (e.g., the host computer 15 in FIG. 6).

Figure 8:
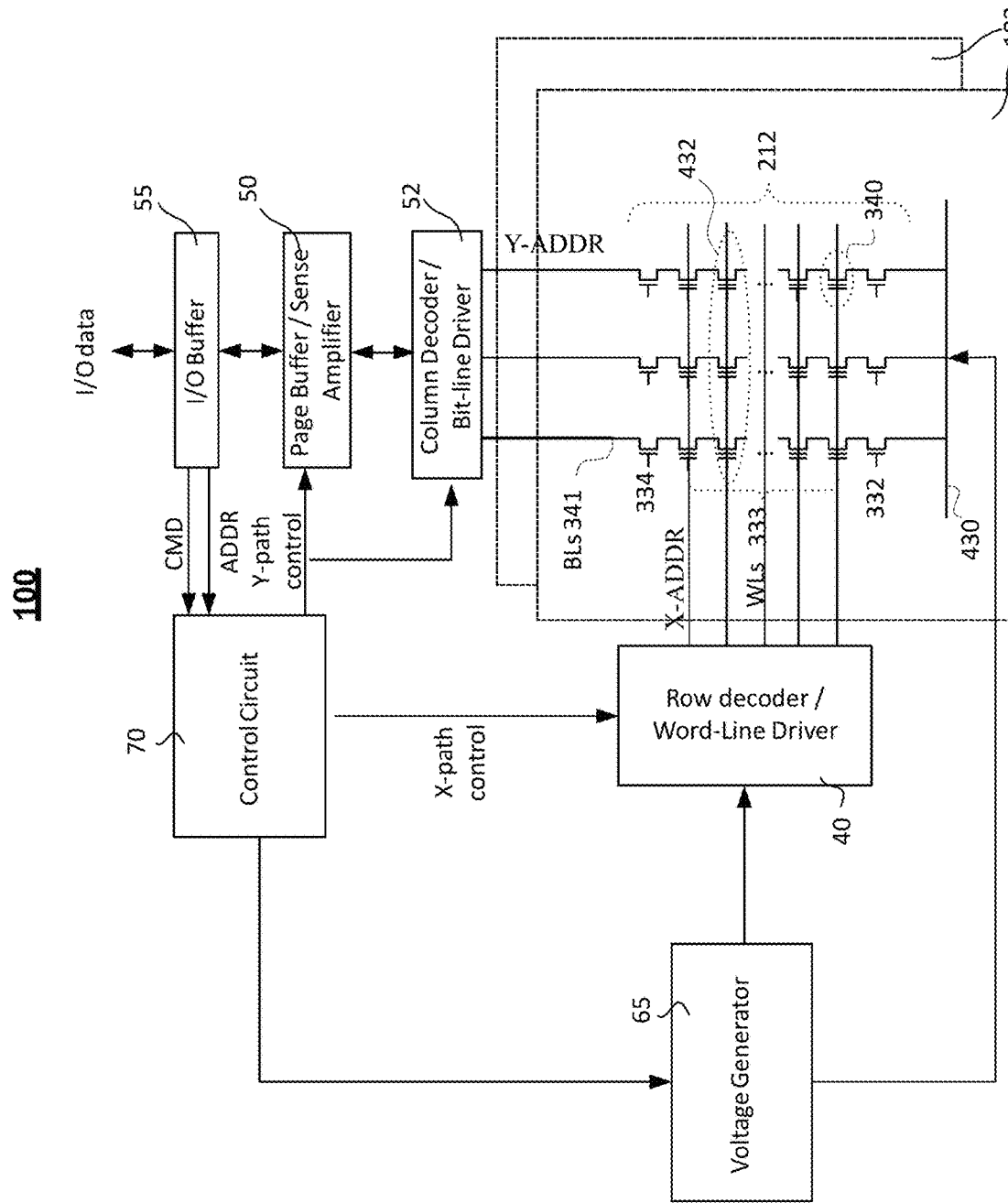
FIG. 8 illustrates a schematic of a three-dimensional (3D) memory die, according to some embodiments of the present disclosure.

FIG. 8 illustrates a schematic diagram of a memory die 100, according to some embodiments of the present disclosure. The memory die 100 includes one or more memory blocks 103 (e.g., 103-1, 103-2, 103-3). Each memory block 103 includes multiple memory strings 212. Each memory string 212 includes multiple memory cells 340. The memory cells 340 sharing the same word line forms a memory page 432. The memory string 212 can also include at least one field effect transistor (e.g., MOSFET) at each end, which is controlled by a lower select gate (LSG) 332 and a top select gate (TSG) 334, respectively. The drain terminal of the top select transistor 334-T can be connected to the bit line 341, and the source terminal of the lower select transistor 332-T can be connected to an array common source (ACS) 430. The ACS 430 can be shared by the memory strings 212 in an entire memory block, and is also referred to as the common source line.

In this example, the memory die 100 can include the 3D memory device shown in FIG. 1K.

The memory die 100 can also include a periphery circuit that includes many digital, analog, and/or mixed-signal circuits to support functions of the memory block 103, for example, a page buffer/sense amplifier 50, a row decoder/word line driver 40, a column decoder/bit line driver 52, a control circuit 70, a voltage generator 65 and an input/output buffer 55. These circuits can include suitable active and/or passive semiconductor devices, such as transistors, diodes, capacitors, resistors, etc.

The memory blocks 103 can be coupled with the row decoder/word line driver 40 via word lines ("WLs") 333, lower select gates ("LSGs") 332 and top select gates ("TSG") 334. The memory blocks 103 can be coupled with the page buffer/sense amplifier 50 via bit lines ("BLs") 341. The row decoder/word line driver 40 can select one of the memory blocks 103 on the memory die 100 in response to a X-path control signal provided by the control circuit 70. The row decoder/word line driver 40 can transfer voltages provided from the voltage generator 65 to the word lines according to the X-path control signal. During the read and program operation, the row decoder/word line driver 40 can transfer a read voltage $V_{read}$ and a program voltage $V_{pgm}$ to a selected word line and a pass voltage $V_{pass}$ to an unselected word line according to the X-path control signal received from the control circuit 70.

The column decoder/bit line driver 52 can transfer an inhibit voltage $V_{inhibit}$ to an unselected bit line and connect a selected bit line to ground according to a Y-path control signal received from the control circuit 70. In the other words, the column decoder/bit line driver 52 can be configured to select or unselect one or more memory strings 212 according to the Y-path control signal from the control circuit 70. The page buffer/sense amplifier 50 can be configured to read and program (write) data from and to the memory block 103 according to the control signal Y-path control from the control circuit 70. For example, the page buffer/sense amplifier 50 can store one page of data to be programmed into one memory page 432. In another example, page buffer/sense amplifier 50 can perform verify operations to ensure that the data has been properly programmed into each memory cell 340. In yet another example, during a read operation, the page buffer/sense amplifier 50 can sense current flowing through the bit line 341 that reflects the logic state (i.e., data) of the memory cell 340 and amplify small signal to a measurable magnification.

The input/output buffer 55 can transfer the I/O data from/to the page buffer/sense amplifier 50 as well as addresses ADDR or commands CMD to the control circuit 70. In some embodiments, the input/output buffer 55 can function as an interface between the memory controller 20 (in FIG. 6) and the memory die 100 on the memory chip 25.

The control circuit 70 can control the page buffer/sense amplifier 50 and the row decoder/word line driver 40 in response to the commands CMD transferred by the input/output buffer 55. During the program operation, the control circuit 70 can control the row decoder/word line driver 40 and the page buffer/sense amplifier 50 to program a selected memory cell. During the read operation, the control circuit 70 can control the row decoder/word line driver 40 and the page buffer/sense amplifier 50 to read a selected memory cell. The X-path control signal and the Y-path control signal include a row address X-ADDR and a column address Y-ADDR that can be used to locate the selected memory cell in the memory block 103. The row address X-ADDR can include a page index PD, a block index BD and a plane index PL to identify the memory page 432, memory block 103, and memory plane 101 (in FIG. 6), respectively. The column address Y-ADDR can identify a byte or a word in the data of the memory page 432.

The voltage generator 65 can generate voltages to be supplied to word lines and bit lines under the control of the control circuit 70. The voltages generated by the voltage generator 65 include the read voltage $V_{read}$, the program voltage $V_{pgm}$, the pass voltage $V_{pass}$, the inhibit voltage $V_{inhibit}$, etc.

What is claimed is:

1. A method for forming a three-dimensional (3D) memory, comprising:

forming a storage stack structure;

forming a storage channel structure that penetrates through the storage stack structure, wherein a top of the storage channel structure comprises a first width in a first direction;

forming a selection stack structure on the storage stack structure;

forming a selection channel hole that penetrates through the selection stack structure to expose a portion of the storage channel structure, wherein a bottom of the selection channel hole comprises a second width and a top opening of the selection channel hole comprises a third width in the first direction;

forming a second recessed opening at a top portion of the selection channel hole, wherein after reaming, a top opening of the second recessed opening comprises a fourth width in the first direction and the fourth width of the second recessed opening is larger than the third width of the selection channel hole, and wherein the forming the second recessed opening comprises:

removing a stop layer from the selection channel hole to expose a conductive layer;

removing a portion of the conductive layer, after removing the stop layer;

removing a portion of an insulating layer on a sidewall of the selection channel hole while forming the second recessing opening; and enlarging the top opening of the selection channel hole to form the second recessed opening; and forming a top selection gate (TSG) cut structure that penetrates through the selection stack structure along a second direction, wherein the TSG cut structure extends in a third direction, the second direction being perpendicular to the first direction and the third direction is perpendicular to the first direction.

2. The method of claim 1, wherein forming the selection channel hole further comprises forming the second width of the selection channel hole smaller than the first width of the top of the storage channel structure in the first direction.

3. The method of claim 1, further comprising, prior to forming the second recessed opening, forming a selection channel structure in the selection channel hole, wherein the selection channel structure penetrates through the selection stack structure and physically and electrically connects to the storage channel structure.

4. The method of claim 3, wherein the forming the selection channel structure comprises:
    forming the insulating layer on an inner side wall surface and the bottom of the selection channel hole;
    selectively removing the insulating layer located at the bottom of the selection channel hole to expose the storage channel structure through isotropic etching;
    forming the conductive layer on a surface of the insulating layer covering a sidewall surface and the bottom of the selection channel hole;
    filling in the selection channel hole with a dielectric material to form a dielectric core; and
    forming the stop layer inside the selection channel hole.

5. The method of claim 4, wherein the forming the stop layer inside the selection channel hole comprises:
    removing a portion of the dielectric core to form a first recessed opening at the top portion of the selection channel hole; and
    disposing the stop layer in the first recessed opening, wherein the disposing the stop layer comprises disposing silicon nitride.

6. The method of claim 1, further comprising forming a selection channel plug in the second recessed opening to contact the conductive layer of a selection channel structure after forming the second recessed opening, wherein the forming the selection channel plug comprises filling in the second recessed opening with a conductive material.

7. The method of claim 1, wherein the forming the TSG cut structure comprises:
    forming a TSG cut that penetrates through the selection stack structure; and
    filling in the TSG cut with a dielectric material to form the TSG cut structure.

8. The method of claim 1, wherein the forming the 3D memory comprises:
    forming a plurality of selection channel structures in rows in the second direction;
    forming the TSG cut structure between adjacent selection channel structure rows; and
    forming the TSG cut structure in a wave shape.

9. The method of claim 3, further comprising aligning the selection channel structure off-axis with the storage channel structure in the first direction to increase a distance between the selection channel structure and an adjacent TSG cut structure.

10. The method of claim 1, wherein the forming the storage stack structure further comprises forming a plurality of sub-storage stack structures and a plurality of sub-storage channel structures separated by TSG cut structures.

11. The method of claim 6, wherein the conductive layer of the selection channel structure and the selection channel plug comprise polysilicon.

* * * * *